(12) United States Patent
Barrett, Jr. et al.

(10) Patent No.: US 7,356,417 B2
(45) Date of Patent: Apr. 8, 2008

(54) METHODS, SYSTEMS AND COMPUTER PROGRAM PRODUCTS FOR DYNAMIC SCHEDULING AND MATRIX COLLECTING OF DATA ABOUT SAMPLES

(75) Inventors: Thomas H. Barrett, Jr., Raleigh, NC (US); Corey D. DeHaven, Apex, NC (US)

(73) Assignee: Monsanto Company, St. Louis, MO (US)

( * ) Notice: Subject to any disclaimer, the term of this patent is extended or adjusted under 35 U.S.C. 154(b) by 486 days.

(21) Appl. No.: 09/818,205

(22) Filed: Mar. 27, 2001

(65) Prior Publication Data

US 2001/0056485 A1    Dec. 27, 2001

Related U.S. Application Data

(60) Provisional application No. 60/192,706, filed on Mar. 28, 2000, provisional application No. 60/192,496, filed on Mar. 28, 2000.

(51) Int. Cl.
*G06F 19/00* (2006.01)
*G06F 15/00* (2006.01)
*C12Q 1/00* (2006.01)
*G11C 17/00* (2006.01)

(52) U.S. Cl. .................... 702/19; 435/4; 365/94; 700/1

(58) Field of Classification Search ............. 702/19; 707/102
See application file for complete search history.

(56) References Cited

U.S. PATENT DOCUMENTS 5,367,619 A    11/1994    Dipaolo et al. ............ 395/149

6,594,588 B1 *  7/2003    Peden et al. ................. 702/32

OTHER PUBLICATIONS

Rudolph et al. Use of a multiwell fluroescence scanner with propidium iodide to assess NMDA mediated excitotoxicity in rat cortical neuronal cultures. Neuroscience Letters vol. 221, pp. 149-152 (1997).*

Slezak et al. A computer-based data analysis system for enzyme-linked immunosorbent assays. J. Immunol. Methods, vol. 65, pp. 83-95 (1983).*

Mikami et al. Association of Bcl-2 Protein Expression with Galbladder Carcinoma Differentiation and Progression and Its Relation to Apoptosis. Cancer vol. 85, pp. 318-325 (1999).*

* cited by examiner

*Primary Examiner*—John S Brusca
(74) *Attorney, Agent, or Firm*—F. Nikki Davis; Howrey LLP

(57) ABSTRACT

Data is collected about samples that possess characteristics that change over time and that are contained in any array of containers arranged in a container spatial relationship. A matrix of cells is displayed in a cell spatial relationship corresponding to the container spatial relationship. The matrix user interface allows a user to enter a large number of data points per minute, compared to conventional systems, which may require a user to swipe a bar code, enter an indicia, or enter a row/column position prior to entering data. Data collection of characteristics of samples also can be scheduled, by storing past values of the characteristics of the samples and also storing rules in a rule base. The rules determine whether a characteristic of a sample is to be data collected and, if so, identify the characteristic which is to be data collected, based on the past values of characteristics of samples.

105 Claims, 33 Drawing Sheets

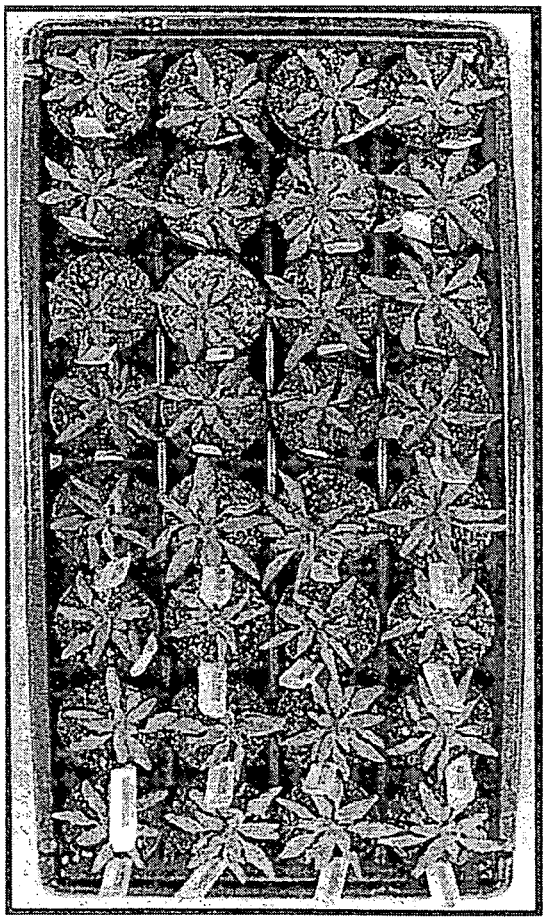
Typical Plant Growth Flat
FIG. 1

Variable Measurement Plan for Mutants

| Data | Day 1 | Day 2 | Day 3 | Day 4 | Day 5 | Day 6 | Day 7 | Day 8 | Day 9 |
|---|---|---|---|---|---|---|---|---|---|
| A | | | | | | | | | |
| B | | | | | | | | | |
| C | | | | | | | | | |
| D | | | | | | | | | |
| E | | | | | | | | | |
| F | | | | | | | | | |
| G | | | | | | | | | |
| H | | | | | | | | | |
| I | | | | | | | | | |

Extinguishing a Measurement

| Data | Day 1 | Day 2 | Day 3 | Day 4 | Day 5 | Day 6 | Day 7 | Day 8 | Day 9 |
|------|-------|-------|-------|-------|-------|-------|-------|-------|-------|
| A    |       |       | No    | No    | No    | Yes   | (Yes) | (Yes) |       |
| B    |       |       |       |       |       |       |       |       |       |

56

Variable Component Lists

| Day | 1 | 2 | 3 | 4 | 5 |
|---|---|---|---|---|---|
| TASK | component 1 | component 2 | component 2 | component 3 | component 6 |
| | component 2 | component 3 | component 3 | component 4 | component 7 |
| | component 3 | component 4 | component 4 | component 5 | component 8 |
| | | component 5 | component 5 | | |

Rules
- When 50% of samples for component 1 ≥ n then activate components 4 & 5 and deactivate 1
- When 50% of samples for component 2 = n then deactivate component 2
- When 75% of samples for component 5 ≥ n then activate components 6, 7, & 8, and deactivate others

*FIG. 33*

# METHODS, SYSTEMS AND COMPUTER PROGRAM PRODUCTS FOR DYNAMIC SCHEDULING AND MATRIX COLLECTING OF DATA ABOUT SAMPLES

CROSS-REFERENCE TO PROVISIONAL APPLICATIONS

This application claims the benefit of Provisional Applications Ser. No. 60/192,706, filed Mar. 28, 2000, entitled Methods for Improving the Efficiency of Recording Data Observed in an Array, and Ser. No. 60/192,496, filed Mar. 28, 2000, entitled Methods for Dynamic Scheduling, the disclosures of both of which are hereby incorporated herein by reference in their entirety as if set forth fully herein.

FIELD OF THE INVENTION

This invention relates to database methods, systems and computer program products, and more particularly to methods, systems and computer program products that are used for data collection and storage in a database.

BACKGROUND OF THE INVENTION

Data collection methods, systems and computer program products are widely used to collect data about a plurality of samples. Data collection methods, systems and computer program products also may be used to schedule times for collection of the data about the plurality of samples. The data that is collected may be stored in a database, and may be processed to attain useful results.

Data collection is widely used, for example, in conducting research with living organisms, such as plants, animals (including human beings), prokayotes, fungi, protists, viruses and prions. In conducting such research, a large number of samples may be used, and data about characteristics of the samples may be collected at various times, to measure changes in characteristics of the samples over time.

A specific example of a plant research environment now will be described. However, similar environments may be found in research environments for other organisms.

In a plant research environment, studies may be made as to gene function in plants, plant growth and maintenance, mutant generation and/or phenomic measurements over a large number of samples, by measuring characteristics of the samples that change over time. A large number of samples, up to hundreds of thousands or more samples, may undergo testing simultaneously. Plants may be studied as they grow in various media, such as in soil or other plates, in very large volumes and at locations that may be spread over different facilities.

It may be difficult to effectively collect data about these samples. In particular, it may be difficult to collect this data in a time-critical matter. Since plant research may measure growing systems that are evolving over time, it may be important to make these measurements at predetermined time intervals. Moreover, because the data is being collected for living organisms, it may be difficult to determine in advance what characteristics are to be measured at what particular time. Finally, many characteristics may need to be recorded, such as color, shape or other attributes of plants. Although some of these measurements may be automated, many of these measurements may need to be done by visual observation and recording, which may be time-consuming and error-prone.

FIG. 1 illustrates a conventional growth flat of samples, here plants. As shown, the growth flat includes a plurality of samples that are contained in an array of containers, here pots, that are arranged in a container spatial relationship, here four rows of eight columns. The plants possess characteristics that change over time. Data is collected at various points in time, concerning various characteristics of the plants. As shown in FIG. 1, each plant may be identified by a bar code or other indicium that is associated with the corresponding container. Often, data is collected by looking down at the flat and determining a characteristic, such as whether a plant has started to produce buds, flowers, leaves, the color of leaves, the number of leaves, etc.

It will be understood that many other types of containers, such as nutrient plates, may be used in plant research. Moreover, in other organism research, other containers, such as test tubes, petri dishes and the like may be used. However, these research efforts all may be characterized as including a plurality of samples that possess characteristics that change over time, the samples being contained in an array of containers that are arranged in a container spatial relationship.

Large numbers of arrays of containers may be stored in a hierarchical organization that includes, for example, buildings, rooms in a building, racks in a room, shelves in a rack, shelf positions in a shelf, flats in a shelf position, and pots in an array in a flat. Thus, each flat may be identified uniquely by its unique position in the hierarchy. This hierarchy may be used to store data in a database system, such as an SQL*GT database system, marketed by Perkin-Elmer Inc. In such a system, the building, room, rack, shelf and position may be modeled as locations, and may be referenced hierarchically to one another. The flat may be modeled as a two-dimensional container, which also may be referred to as a "plate" in the SQL*GT system. The pots may be modeled as samples. It will be understood, however, that many other database systems may be used to store data about a plurality of samples that are contained in an array of containers, and that possess characteristics that change over time.

Accordingly, although the data that has been collected can be efficiently stored in a database, there still may be a need for methods, systems and computer program products that can allow efficient data collection and efficient scheduling of data collection.

SUMMARY OF THE INVENTION

Methods, systems and computer program products according to embodiments of the invention collect data about a plurality of samples that possess characteristics that change over time and that are contained in an array of containers that are arranged in a container spatial relationship. A matrix of cells is displayed in a cell spatial relationship that corresponds to the container spatial relationship. User input is accepted into at least one of the cells of the matrix that is displayed, to input at least one value of at least one of the characteristics that change over time for at least one of the samples that correspond to the at least one of the cells in the matrix that is displayed. According to other embodiments, the at least one value of the at least one of the characteristics that change over time for the at least one of the specimens is stored in a database.

These embodiments of the invention can stem from a realization that data can be collected more efficiently by representing the array of containers as a similar matrix of cells on a display, so that visual observation or other data that is collected can be rapidly entered into the displayed matrix at the corresponding position. Thus, an individual sample need not be identified using a bar code or other indicia, or by identifying its row/column location in the array. The matrix user interface can allow a user to enter a large number of data points per minute, compared to conventional systems in which a user may need to swipe a bar code, enter an indicia or enter a row/column position for a sample prior to entering data.

According to other embodiments of the invention, prior to displaying the matrix of cells, user selection of an array of containers from a plurality of arrays of containers is accepted. In other embodiments, user selection of a characteristic from the characteristics that change over time also is accepted. The matrix of cells that is displayed includes data entry parameters for the characteristic that was selected. Thus, the matrix can be "data aware", and can display the data entry parameters for the characteristic that was selected. For example, a Yes/No selection, a data entry box for a value and/or a pull-down menu of selection options may be displayed for each cell of the matrix, depending upon the characteristic that was selected for data collection. Moreover, user instructions also may be displayed for obtaining the value of the characteristic that was selected.

According to other embodiments of the invention, user input into the cells of the matrix may be accepted by accepting user input of a default value of the characteristic for the cells of the matrix that is displayed, and accepting user input into at least one of the cells of the matrix that is displayed, of at least one value that is different from the default value. According to other embodiments, the default value for the cells of the matrix is stored in the database, except that the at least one value that is different from the default value is stored in the database for the cells that have a different value. These embodiments of the invention may stem from a realization that in data collection for an array of samples, it is often the case that most of the samples in an array all have the same value for a given characteristic, and only a few of the samples have a value that is different. For example, for a physical observation on a seedling color, two of the seedlings may be observed to be red, whereas all of the remaining seedlings may be observed to be green. By using these embodiments of the present invention, the two red seedling values can be entered rapidly and all of the remaining seedlings can have the default value, which is green in this case. Efficient data entry may be obtained.

According to other embodiments of the invention, prior to the storing in the database, a user input may be accepted into at least one of the cells of the matrix that is displayed, of at least one corrected value of at least one of the characteristics that change over time, for at least one of the samples. Accordingly, data may be corrected before it is committed to the database. In other embodiments, the data may be corrected after it is stored.

The above-described embodiments that display a matrix of cells and accept user input into the cells of the matrix may be used repeatedly to collect data for a plurality of matrices of cells that correspond to a plurality of arrays of containers. Moreover, the displaying and accepting may be repeatedly performed to collect data for a plurality of characteristics that change over time. Moreover, the displaying and accepting may be repeatedly performed to collect data over a plurality of sequential time intervals. Accordingly, data collection may be performed efficiently.

It also may be desirable to provide efficient scheduling of data collection. In particular, one purpose of collecting data about the plurality of samples may be to find changes in various samples that occur over time as a result of mutations, environmental factors and/or other factors. By definition, the time that these changes occur may be unknown. Thus, in order to capture the changes as they occur, it may be necessary to collect data about all of the samples at all points in time.

In sharp contrast, embodiments of the invention can schedule data collection of characteristics of a plurality of samples, by storing past values of the characteristics of the samples that were data collected during at least one past time interval in a database, and also storing a plurality of rules in a rule base. The plurality of rules determine whether a characteristic of a sample is to be data collected and, if so, identify the characteristic which is to be data collected, based on the values of characteristics of samples. The plurality of rules is applied to the plurality of past values that are stored in the database, to identify target samples to be data collected from the plurality of samples, and to identify at least one target characteristic to be data collected for the target samples that are identified. User instructions are generated to collect data for the at least one target characteristic to be data collected in the target samples to be data collected. Accordingly, dynamic scheduling may be provided that can identify target samples to be data collected and target characteristics to be data collected in the identified samples based on past values of data that were collected. Data collection may be scheduled efficiently, and the amount of unnecessary data that is collected can be reduced and preferably can be minimized.

According to other embodiments of the invention, in response to the user instructions that are generated, user input may be accepted of at least one value of the at least one target characteristic to be data collected in the target samples to be data collected. The at least one target value of the at least one target characteristic to be data collected then may be stored in the database. The above-described applying the rules to the past values, generating user instructions, accepting user input and storing in the database may be repeatedly performed in sequence during a plurality of time intervals, to thereby obtain dynamic scheduling of data collection.

In one embodiment, the rules may include a rule that begins or terminates data collection of a characteristic in a sample based on a percentage of the samples that have a value of the characteristic during a past time interval. Other rules can begin or terminate data collection of a first characteristic in a sample based on a percentage of the samples having a value of a second characteristic during a past time interval. Other rules can begin or terminate data collection of a characteristic in a sample based on a percentage of the samples failing to have the characteristic during a past time interval. Yet other rules can begin or terminate data collection of a first characteristic in a sample based on a percentage of the samples failing to have a second characteristic during a past time interval. Accordingly, population-based decisions may be used to determine, for example, when a growth stage occurs, so that minor variants in a given sample can be canceled out or averaged by the population. Other rules, ranging from simple to complex, may be provided.

It will be understood that matrix collecting and dynamic scheduling embodiments of the present invention may be used separately to allow efficient data collection. However, matrix collecting and dynamic scheduling may be used together in embodiments of the invention that provide dynamic scheduling and use matrix collecting to allow efficient data collection of data that is scheduled by dynamic scheduling. In these embodiments, dynamic scheduling can allow only those characteristics for those samples that may be determinative to be collected and can allow the determinative characteristics and samples to be collected efficiently using matrix collecting.

BRIEF DESCRIPTION OF THE DRAWINGS

FIG. 1 illustrates a conventional growth flat of plants.

FIGS. 6-18 illustrate user interfaces that may be used for matrix data collection according to embodiments of the present invention.

FIG. 27 is a representation of a conventional data collection plan.

FIG. 29 illustrates application of dynamic scheduling according to embodiments of the present invention to the conventional data collection plan of FIG. 27.

FIG. 33 illustrates an example of rules that are based on percentages for dynamic scheduling according to embodiments of the present invention.

FIGS. 34A and 34B, which when placed together as shown form

DETAILED DESCRIPTION OF PREFERRED EMBODIMENTS

Figure 2:
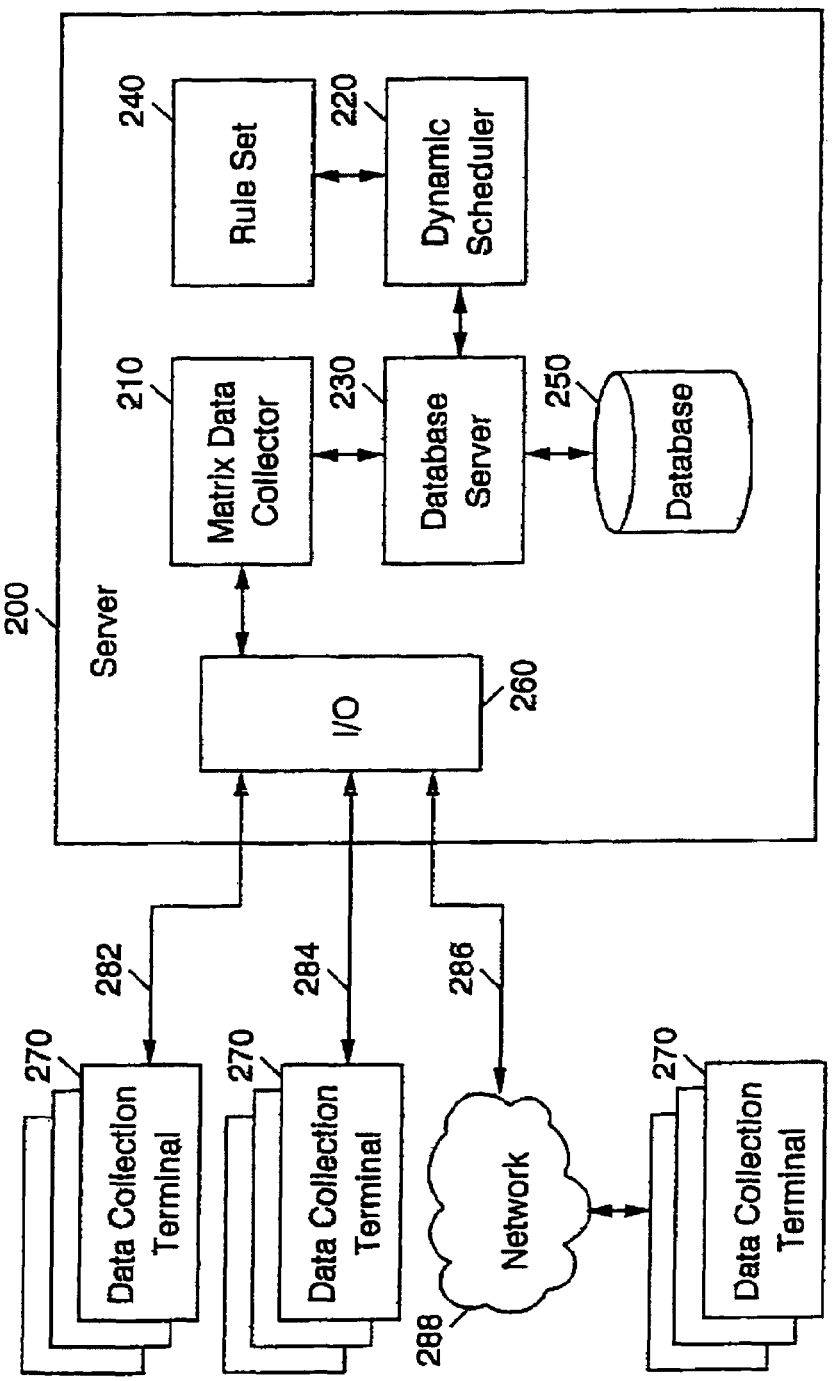
FIG. 2 is a block diagram of systems according to embodiments of the invention that can practice methods and/or include computer program products according to embodiments of the invention for matrix data collection and dynamic scheduling of data collection.

The present invention now is described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout the description of the drawings.

As also will be appreciated by one of skill in the art, the present invention may be embodied as methods, data processing systems, and/or computer program products. Accordingly, the present invention may take the form of an entirely hardware embodiment, an entirely software embodiment running on general purpose hardware or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices and/or magnetic storage devices.

Computer program code for carrying out operations of the present invention may be written in an object oriented programming language such as JAVA®, Smalltalk or C++. The computer program code for carrying out operations of the present invention may also be written in a conventional procedural programming language, such as "C". Microsoft Active Server Pages (ASP) technology and Java Server Pages (JSP) technology may be utilized. Software embodiments of the present invention do not depend on implementation with a particular programming language. The program code may execute entirely on one or more Web servers and/or application servers, or it may execute partly on one or more Web servers and/or application servers and partly on a remote computer (i.e., a user's Web client), or as a proxy server at an intermediate point in a network. In the latter scenario, the remote computer may be connected to the Web server through a LAN or a WAN (e.g., an intranet), or the connection may be made through the Internet (e.g., via an Internet Service Provider).

The present invention is described below with reference to block diagram and flowchart illustrations of methods, apparatus (systems) and computer program products according to embodiments of the invention. It will be understood that each block of the block diagrams and/or flowchart illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create structures for implementing the functions specified in the block diagram and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function specified in the block diagram and/or flowchart block or blocks.

The computer program instructions may also be loaded onto a computer or other programmable data processing apparatus to cause a series of operational steps to be performed on the computer or other programmable apparatus to produce a computer implemented process or method such that the instructions which execute on the computer or other programmable apparatus provide steps for implementing the functions specified in the block diagram and/or flowchart block or blocks.

Some embodiments of the present invention may be practiced on a single data collection computer that can include matrix data collection and/or dynamic scheduling, as well as a database for storing the data and/or a rule base for storing rules. However, because other embodiments of the present invention may involve the use of multiple data collection terminals and storing of a large number of values/rules for a large number of samples, embodiments of the present invention may be implemented on a client-server system, wherein at least one client data collection terminal and at least one server computer are connected to one another.

Referring now to FIG. 2, systems according to embodiments of the invention, that can practice methods and/or include computer program products according to embodiments of the invention, are schematically illustrated. As shown, a server system 200 and at least one data collection terminal 270 are connected using a wire connection 282, a wireless connection 284 and/or a network connection 286 using a network 288, such as a local area network, wide area network and/or the Internet. The data collection terminals 270 may comprise laptop computers, personal computers or workstations, wireless terminals, personal digital assistants and/or custom data collection terminals, and may include a display, a user input interface such as a keyboard and/or a pointing device such as a mouse, and also may include one or more sensors or transducers for obtaining measurements of characteristics of samples. The data collection terminals 270 may be connected to the server continuously, intermittently when collecting data and/or intermittently to download a schedule of data to be collected and to upload data collection results.

Still referring to FIG. 2, the server 200 may be embodied in one or more personal, application and/or enterprise computers. The server 200 also can include an input/output subsystem 260 that interfaces the server 200 and the data collection terminals 270.

Still referring to FIG. 2, a database 250 can store the data that is collected and/or a data collection schedule in a manner that will be described in detail below. As is known to those of skill in the art, a database is a collection of data that can be organized in tables and/or other conventional forms of organization. The database 250 may include a database manager and/or database server 230 that facilitates accessing, managing and updating data within the various tables of the database 250. Exemplary types of databases 250 that can be used according to embodiments of the present invention include relational databases, distributed databases (databases that are disbursed or replicated among different points in a network), and object oriented databases. Relational, distributed and object oriented databases are well understood by those having skill in the art and need not be described further herein.

The database server 230 operates as a "middleman" server between other components of the server 200 and the database 250. The database server 230 generally includes program code and logic for retrieving data from the database 250 in response to external requests. Commercial database servers that may be utilized as a database server 230 in the server 200 include Microsoft's SQL server, IBM's DB2® universal database server, and Oracle's SQL server running the SQL*LIMS™ application marketed by Perkin-Elmer Inc.

Still referring to FIG. 2, the server 200 also contains a matrix data collector 210 that causes a matrix of cells to be displayed and accepts user input into at least one of the cells of the matrix, according to embodiments of the present invention. It will be understood that the matrix data collector 210 may be included in the data collection terminals 270 in other embodiments of the invention. Moreover, the matrix data collector 210 may be divided into a server portion in the server 200, and a client portion in the data collection terminals 270.

Still referring to FIG. 2, the server 200 also includes a dynamic scheduler 220 that applies a plurality of rules in a rule set 240 to a plurality of values of characteristics that have been data collected and that have been stored in the database 250, to identify target samples to be data collected and to identify at least one target characteristic to be data collected for the target samples that are identified. The rule set 240 may be stored in a rule base that is part of and/or separate from, the database 250. It also will be understood that although the dynamic scheduler 220 is shown as part of server 200, it may also be embodied in the data collection terminals 270 or may be embodied as a server portion in the server 200 and a client portion in the data collection terminals 270.

Finally, it will be understood that embodiments of the present invention may include the matrix data collector 210 without including the dynamic scheduler 220 and the rule set 240. Such embodiments can collect data using a displayed matrix of cells in a cell spatial relationship that corresponds to the container spatial relationship of the samples, without dynamically scheduling the data collection based on application of rules to values that are stored in a database. Moreover, other embodiments may include the dynamic scheduler 220 and the rule set 240, without including the matrix data collector 210. In these embodiments, scheduling of data collection may be performed dynamically by applying rules to values that are stored in the database 250, without using the matrix user interface for data collection.

Figure 3:
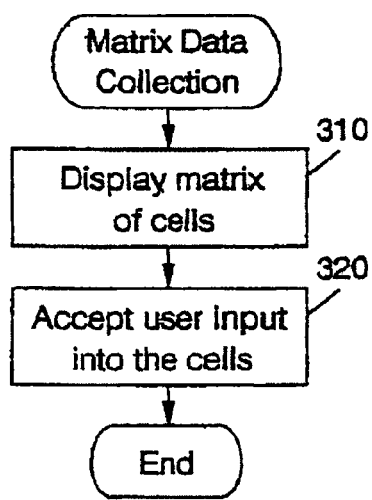
FIG. 3 is a flowchart of operations for matrix data collection according to embodiments of the present invention.

Referring now to FIG. 3, operations for matrix data collection according to embodiments of the invention, now will be described. It will be understood that these operations may be performed by the matrix data collector 210 of FIG. 2.

Figure 6:
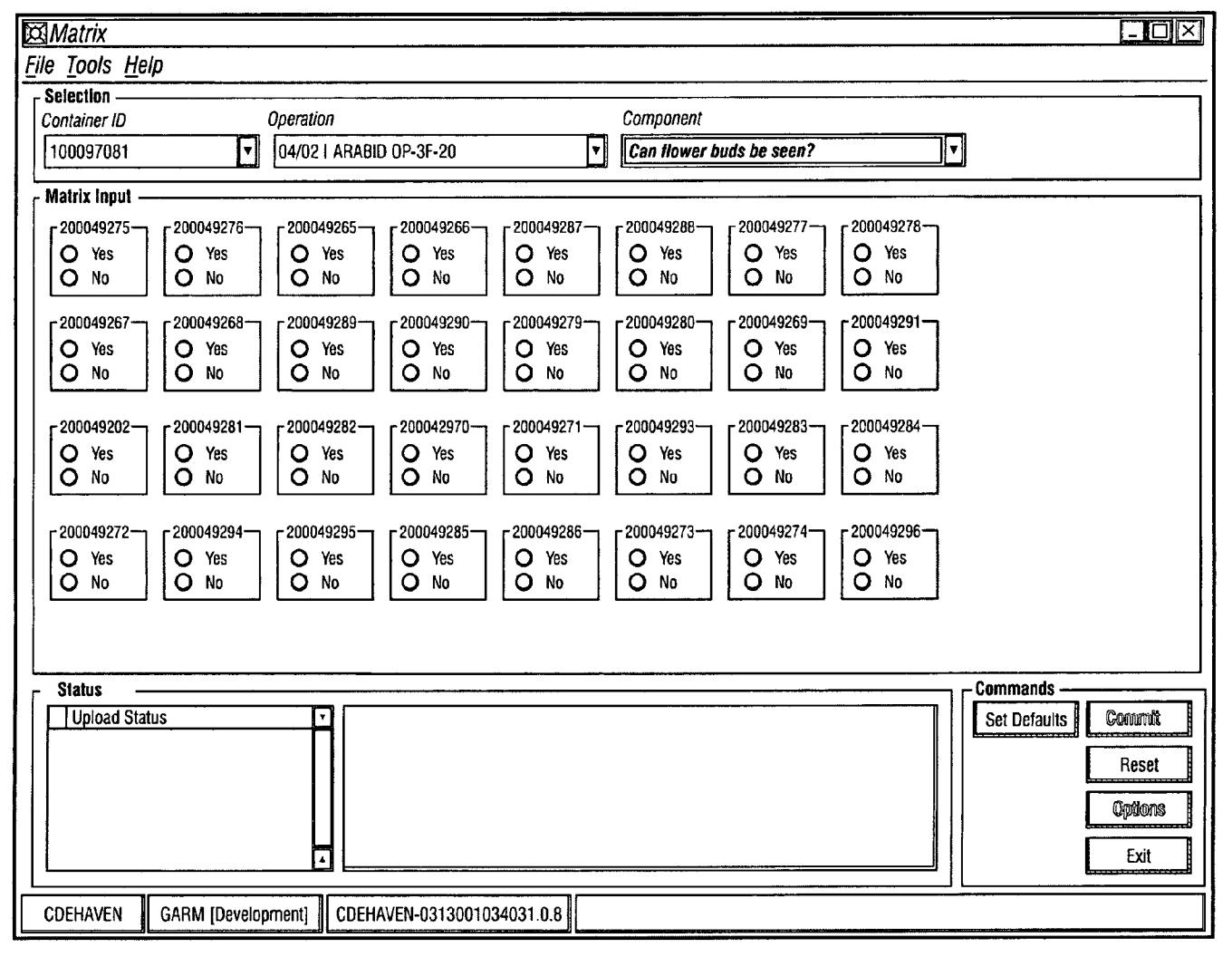

Referring to FIG. 3, these operations may be performed to collect data about a plurality of samples that are contained in an array of containers that are arranged in a container spatial relationship, such as the container spatial relationship of FIG. 1, and that possess characteristics that change over time. At Block 310, a matrix of cells is displayed in a cell spatial relationship that corresponds to the container spatial relationship. FIG. 6 is an example of a matrix of cells in a cell spatial relationship that corresponds to the container relationship. As shown in FIG. 6, an array of four rows and eight columns of cells is displayed that corresponds to the array of four rows and eight columns of containers of FIG. 1.

Referring again to FIG. 3, at Block 320, user input is accepted into at least one of the cells of the matrix that is displayed, of at least one value of at least one of the characteristics that change over time, for at least one of the samples that corresponds to the at least one of the cells of the matrix that is displayed. Thus, for example, referring again to FIG. 6, each cell accepts a Yes/No user input as to whether the flower buds can be seen in the sample that is contained in the container of the array of containers at a position that corresponds to the position of the cell in the matrix. It will be understood, however, that although a Yes/No selection is illustrated, data entry boxes also may be used to obtain entry of alphanumeric data. Pull-down menus and/or other conventional means also may be used to allow selection from a plurality of choices. Moreover, user selection may be allowed to provide measuring of data using a transducer or other measuring device that is attached to, or is separate from, the data collection terminal 270 of FIG. 2.

Matrix data collection according to embodiments of the present invention can allow massive amounts of physical observations and/or measurements to be entered into a database efficiently. By recognizing that the samples are arranged in arrays of containers and providing a user interface matrix that is consistent with this arrangement, efficient data collection may be obtained. A much greater data volume may be allowed, because the cost of data entry may be predominated by labor costs of data collection. The cost of the storage facility, soil and seeds may be relatively low. By increasing and preferably maximizing the number of observations/measurements a user can enter, in a short period of time, the overall cost of the experimentation can be reduced.

Matrix data collection allows a graphical view of each sample that is in a container to be shown. It can graphically illustrate the array of containers and each sample in its position in the array. Rapid container-based database entry thereby may be obtained. In one example, a user can enter approximately fifty data points per minute. The graphical user interface is data aware, and it shows what type of data is desired for entry, such as Yes/No, text, numeric and/or a choice list.

Figure 4:
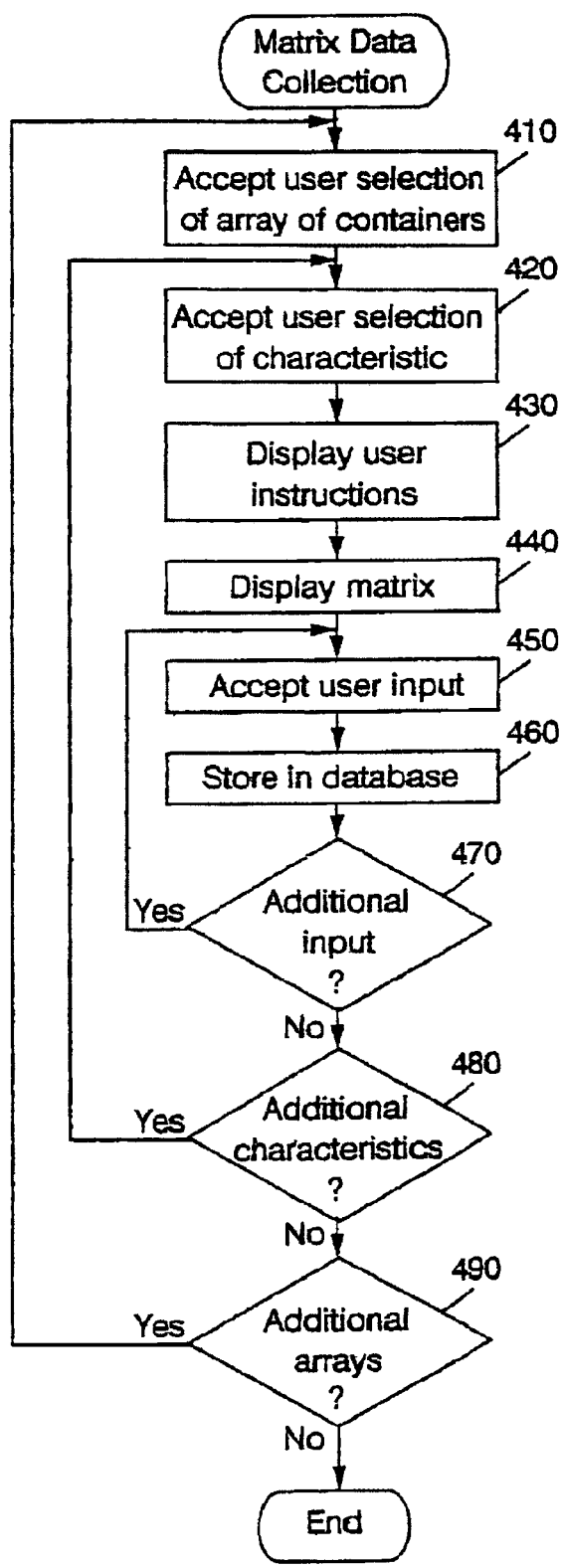
FIG. 4 is a flowchart of operations for matrix data collection according to other embodiments of the present invention.
Figure 7:
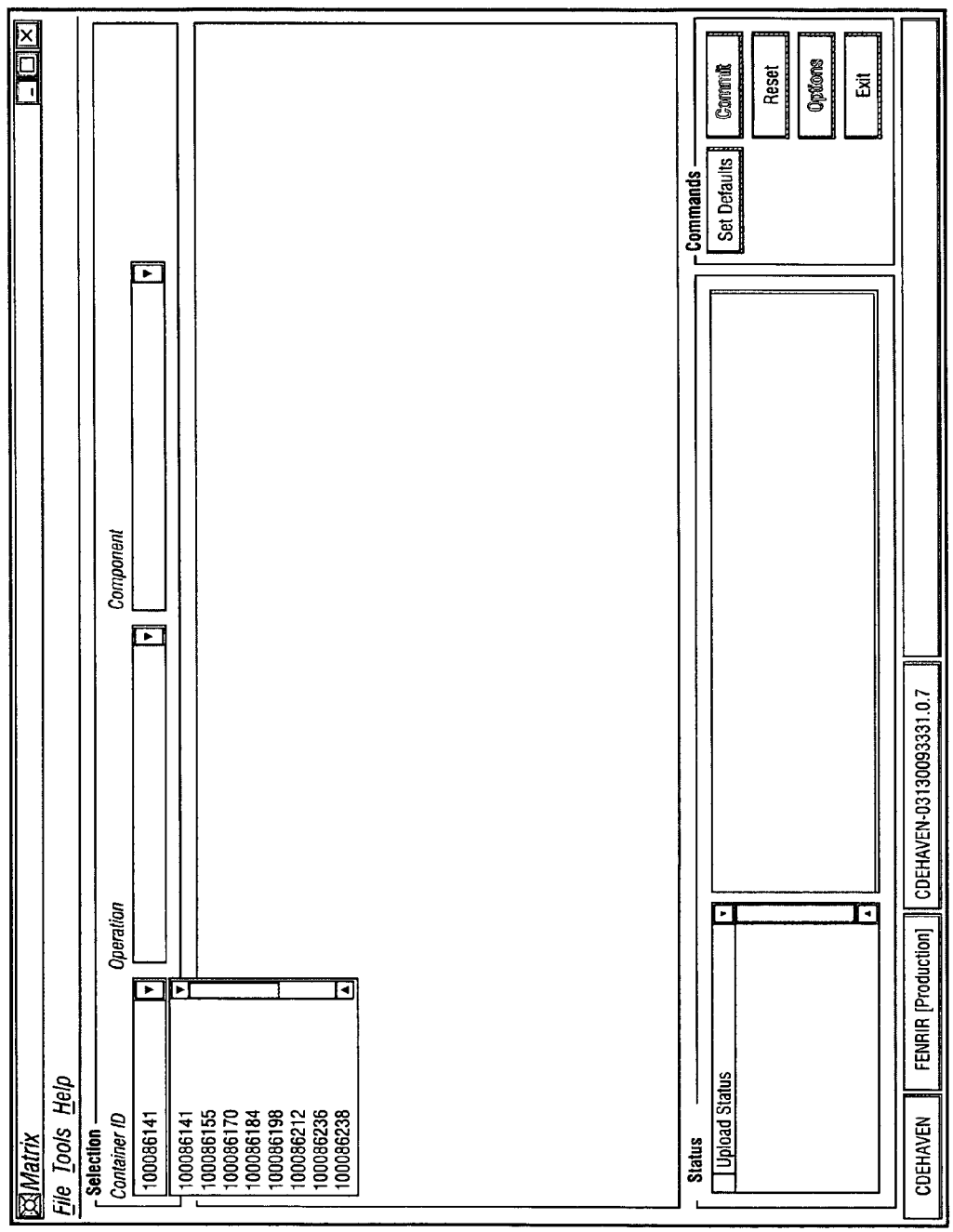

Referring now to FIG. 4, other embodiments of matrix data collection will be described. These operations may be performed by the matrix data collector 210 of FIG. 2. As shown in FIG. 4, at Block 410, a user selection of an array of containers from the plurality of arrays of containers is accepted. FIG. 7 illustrates a user interface that allows a user to select a container flat ID at the upper left. The container flat ID may be selected by scanning a bar code, by typing in a number and/or by performing a search through a hierarchy of flats.

Figure 8:
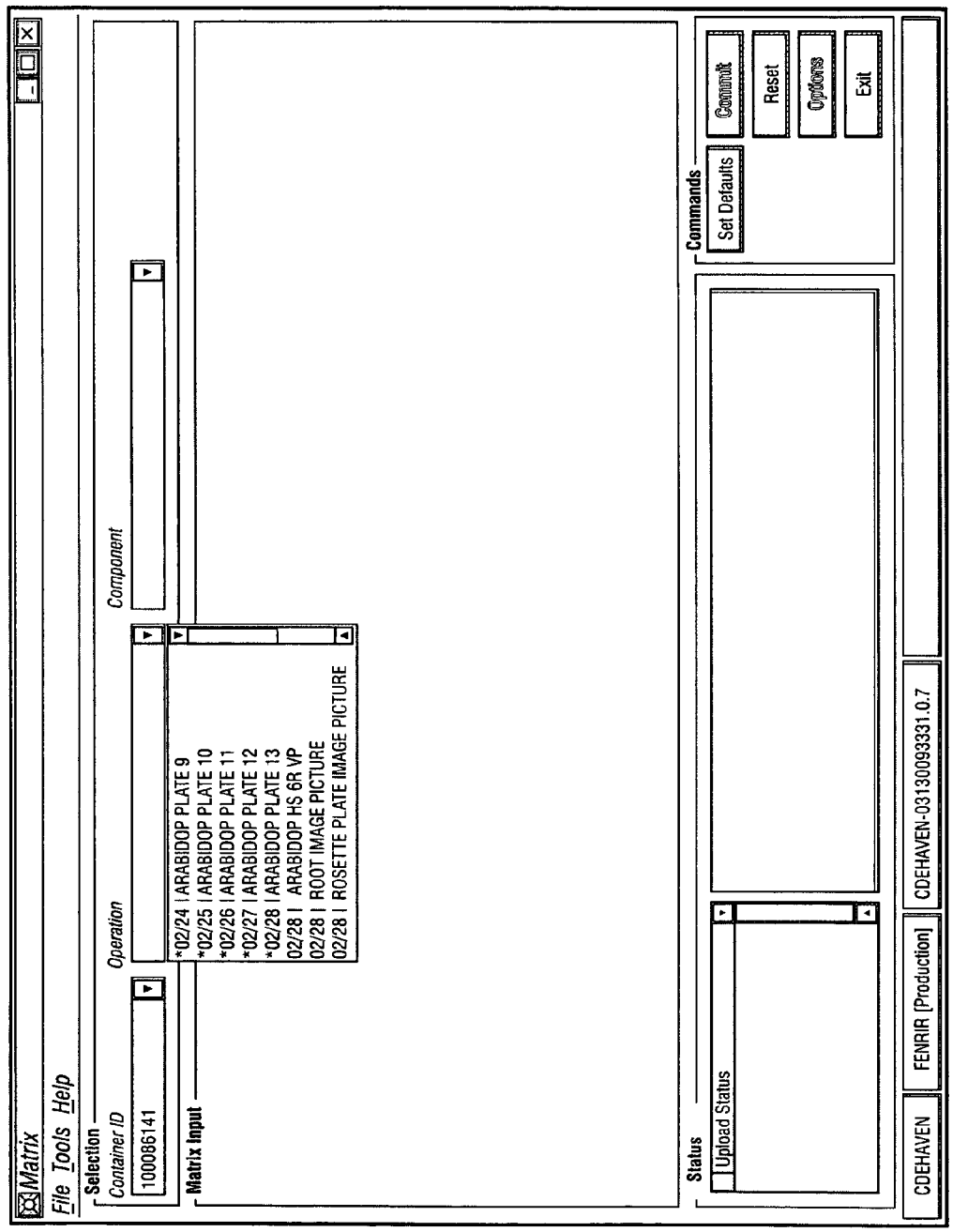
Figure 9:
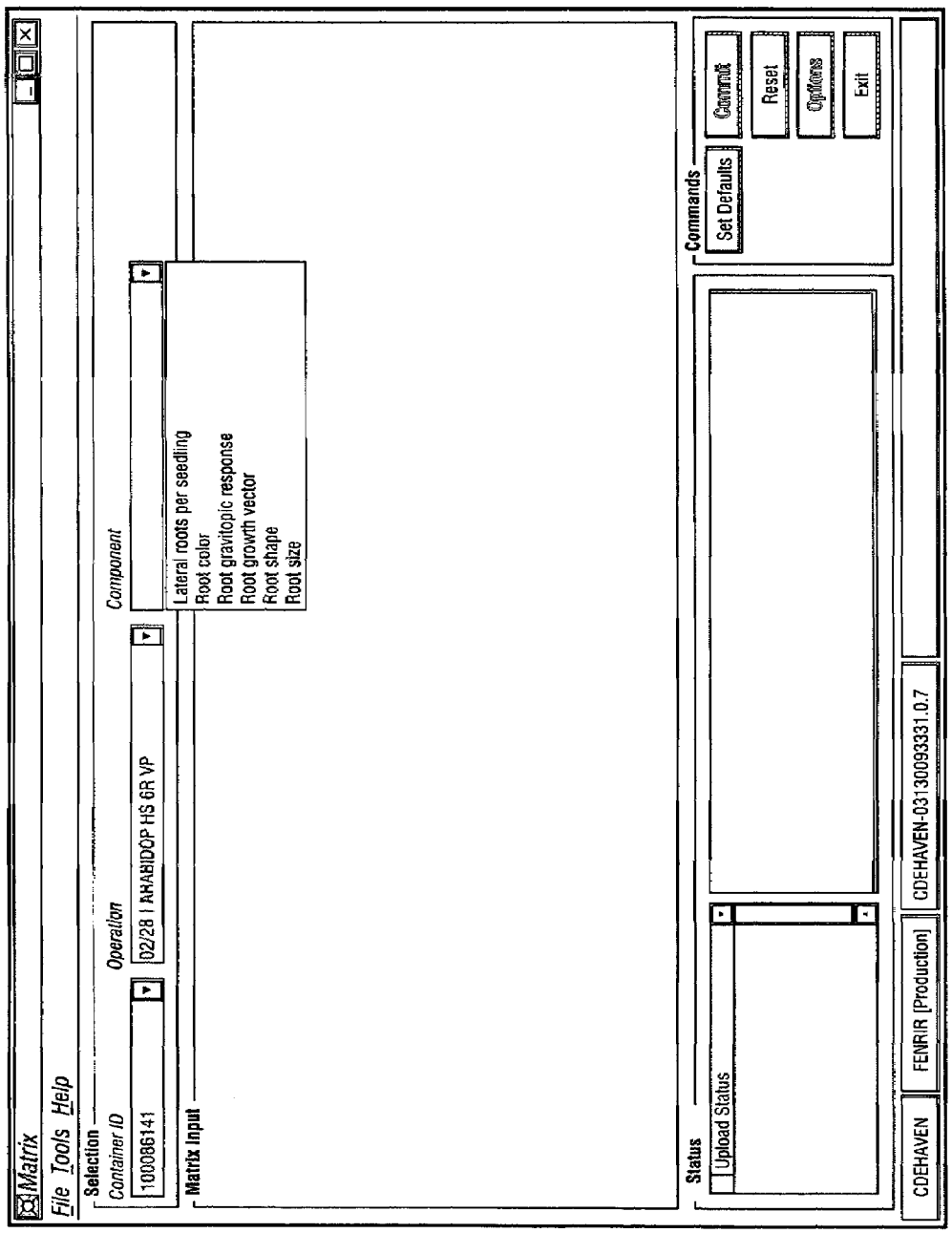

Returning to FIG. 4, at Block 420, a user selection of a characteristic from the characteristics that change over time, is accepted. The characteristics may be accepted in two stages. For example, as shown in FIG. 8, a data collection operation to be performed on an array of containers is selected from a list of operations. The operations include a listing of days in the life of a sample. As shown in FIG. 8, some of the operations include an asterisk to the left, to indicate that all of the samples for that operation already have been data collected. Thus, the user can determine the due date and select the operation that is desired to be measured. Then, at FIG. 9, a characteristic to be measured, also referred to herein as a "component", is selected from a list of characteristics or components.

Then, referring back to FIG. 4, user instructions for the data collection may be displayed at Block 430, and the matrix may be displayed at Block 440. As was already described, FIG. 6 illustrates an example of a matrix that is displayed. Under the heading "Component", the user instruction also is displayed. For example, "Can flower buds be seen?" is displayed.

Referring again to Block 450 of FIG. 4, user input into the matrix then is accepted. For example, as was described above, user input may be accepted by allowing the user to click on Yes/No for each of the cells in the matrix of FIG. 6.

Figure 10:
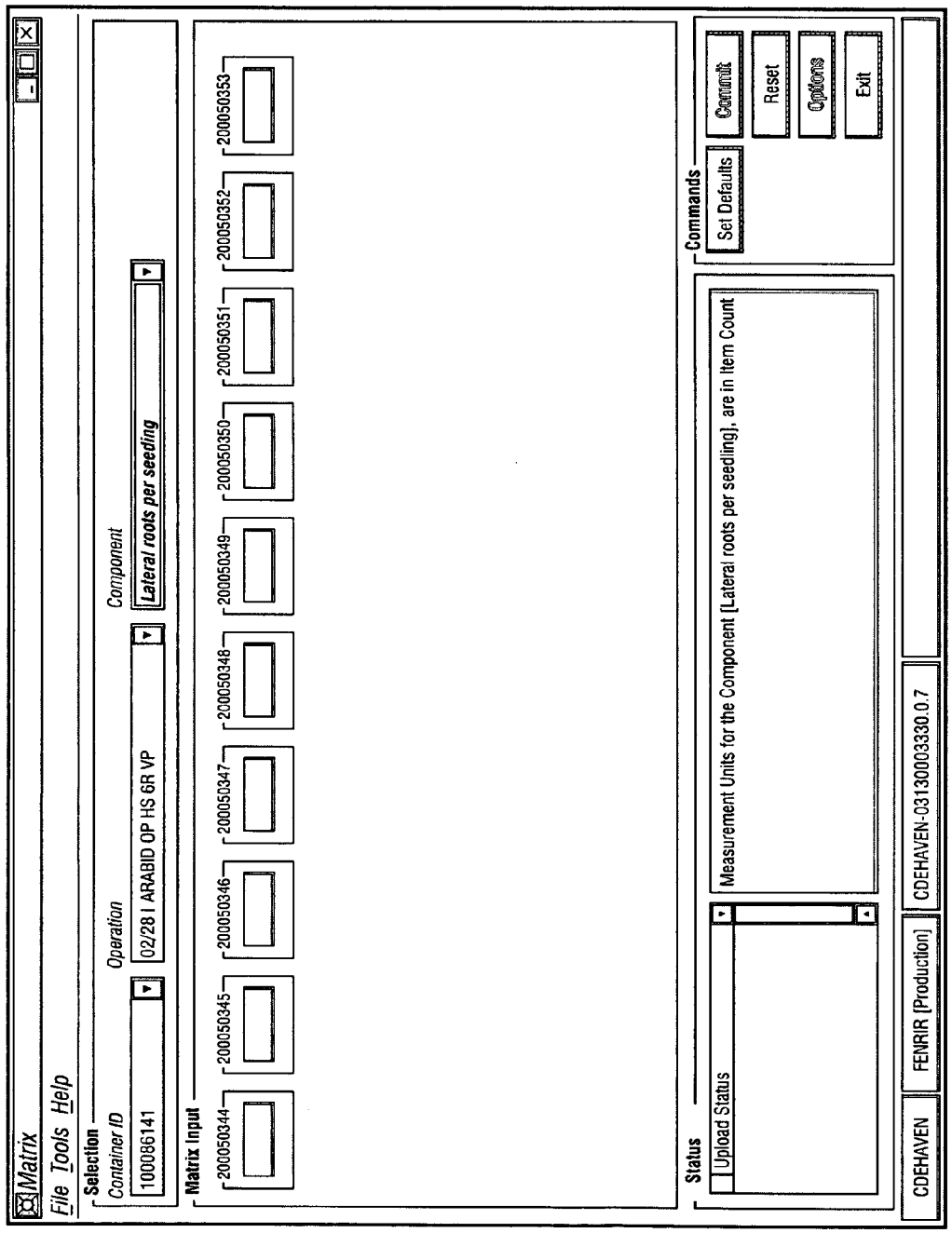
Figure 11:
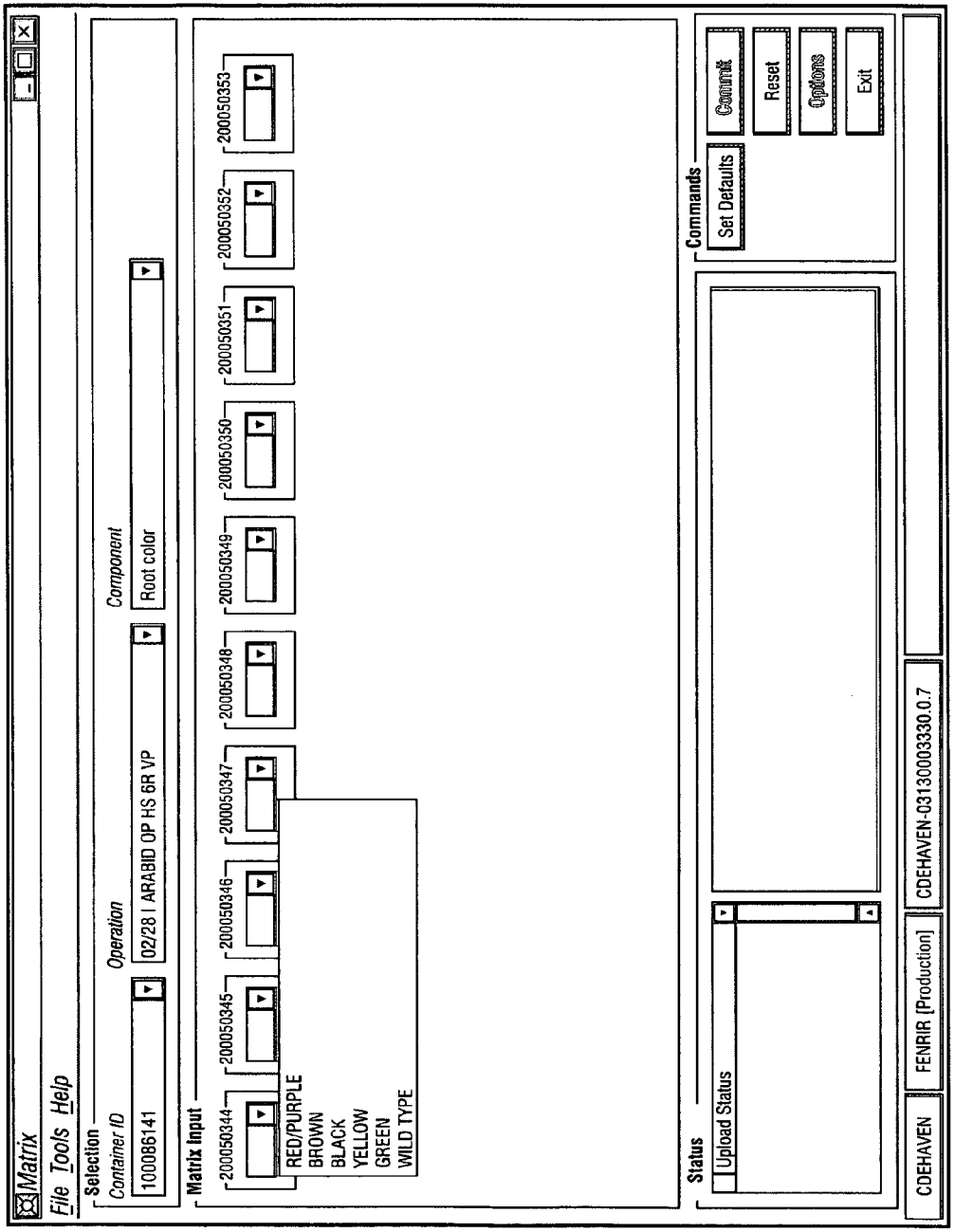
Figure 12:
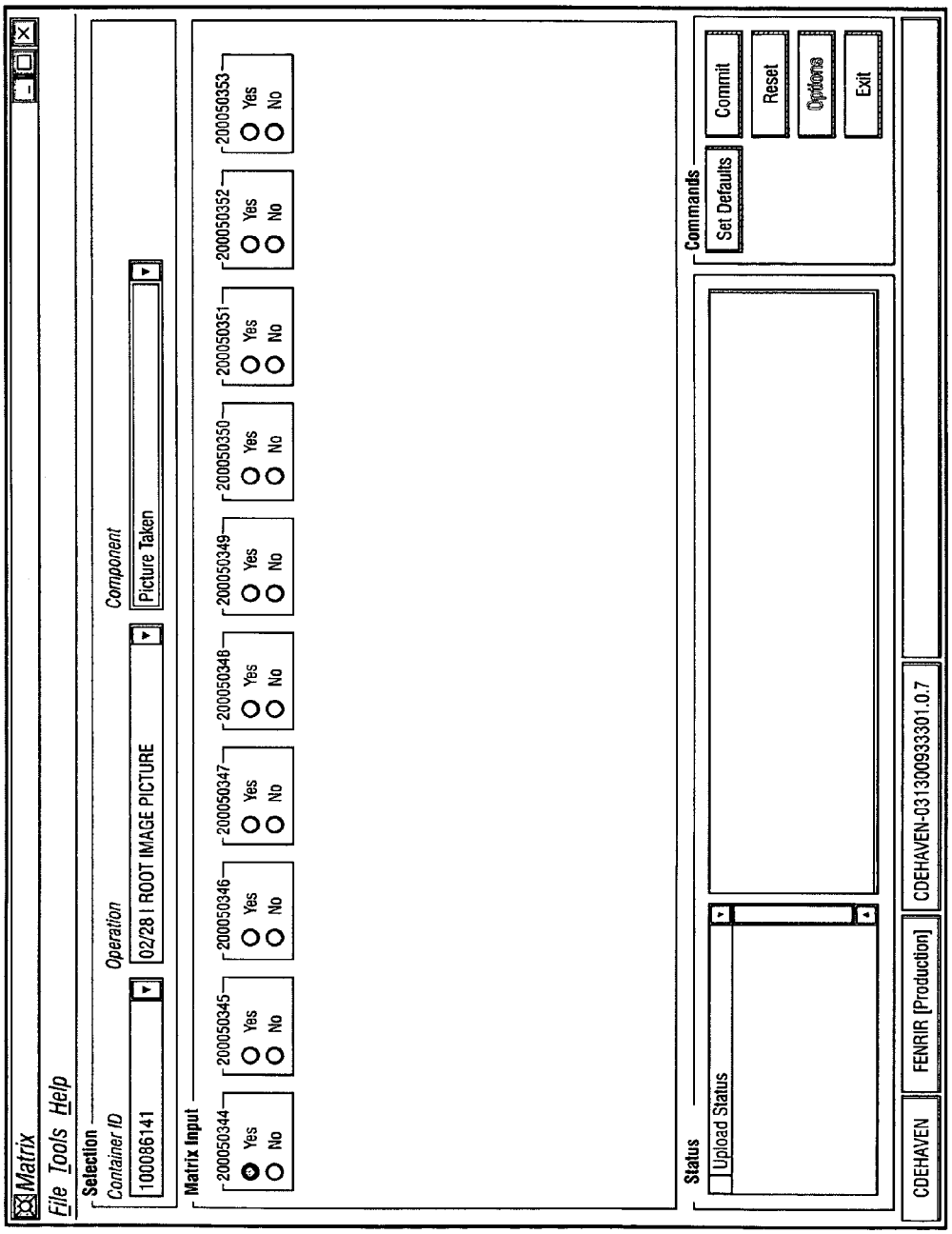

As was described above, the matrix preferably is data aware. In other words, since the characteristic to be measured has been selected, the matrix can display the proper choice of text, numeric or selection parameters that need to be entered. Thus, for example, in FIG. 6, a Yes/No selection of data entry parameters is displayed. FIG. 10 provides an example of a numeric input for lateral roots per seedling. In FIG. 10, the status area at the bottom of the display also shows what the measurement units are for this particular component, because they could either be text or numeric. Thus, in FIG. 10, a message is displayed to tell the user that this parameter is an item count. FIG. 11 illustrates the use of a pull-down menu as a choice list for root color. FIG. 12 is another example of a Yes/No parameter input.

Figure 5:
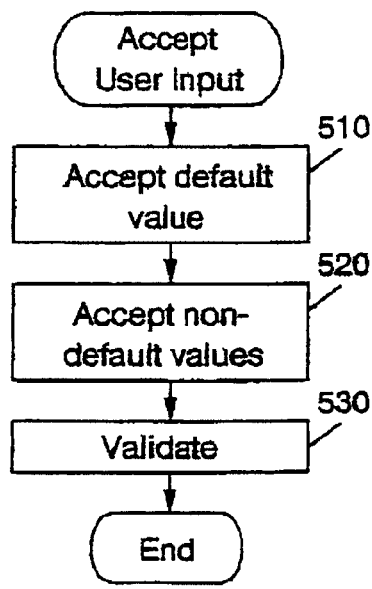
FIG. 5 is a flowchart of operations for accepting user input into a matrix according to embodiments of the present invention.

Referring now to FIG. 5, additional details of accepting user input according to embodiments of the present invention will be described. These operations may correspond to Block 450 of FIG. 4. These embodiments allow the input of default values.

Figure 13:
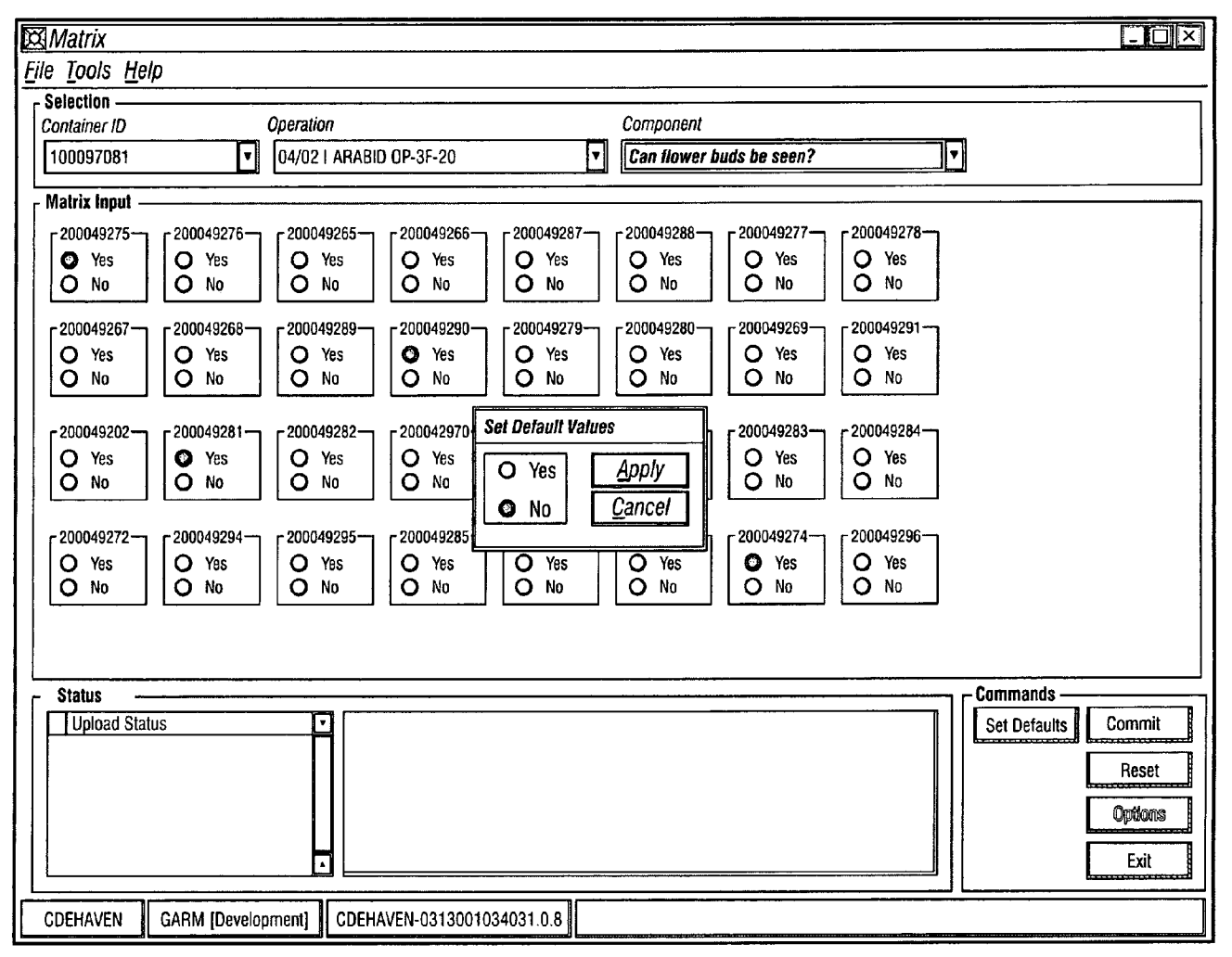
Figure 14:
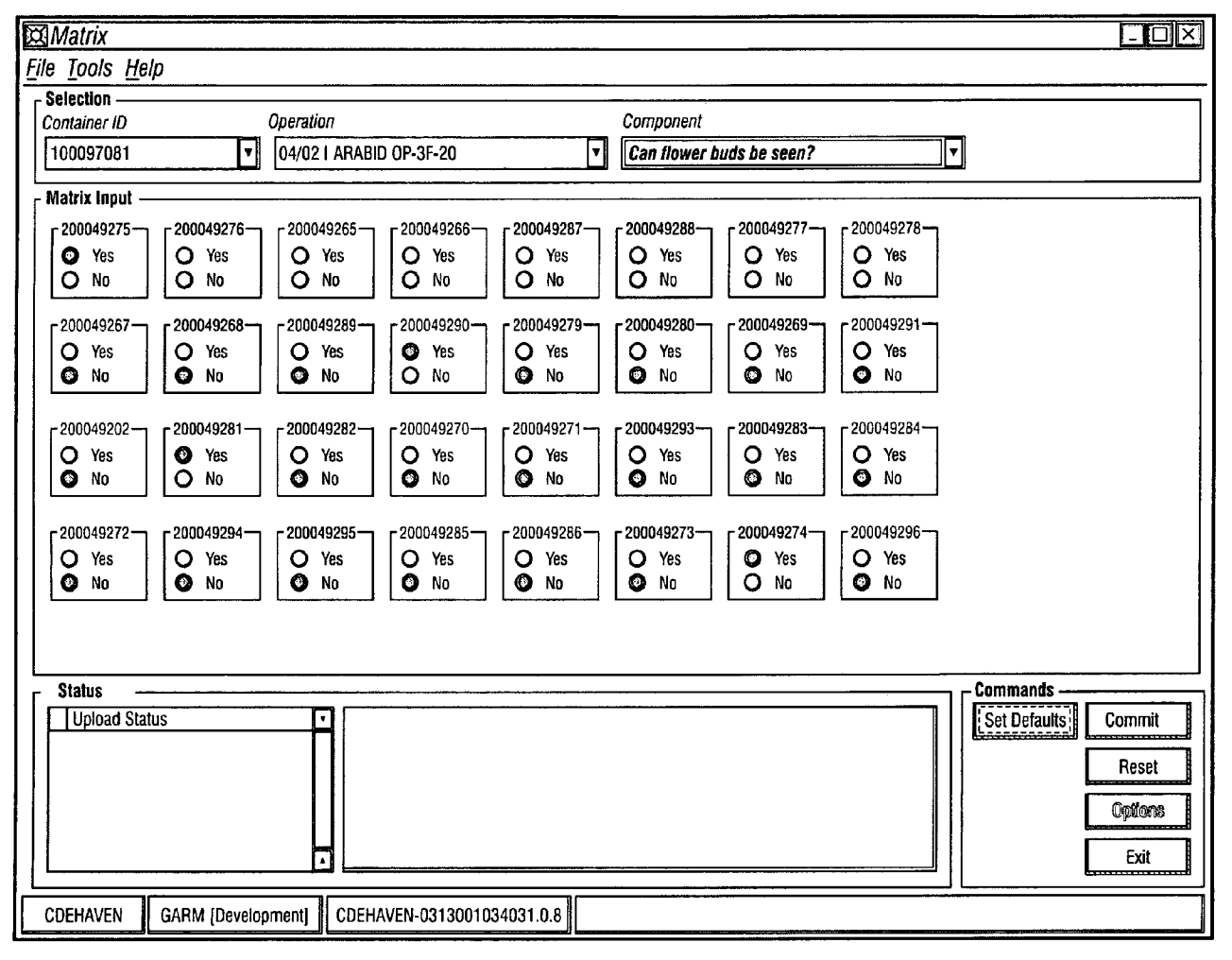

In particular, these embodiments stem from a realization that much of the data entry by container can be entered by exception. For example, if a plate is filled with seedlings, it may be clearly visible that one of the seedlings is red, whereas the rest of them are green. By allowing default values, this data can be entered efficiently. Thus, a default value, such as green, can be applied. Then, the default can be overridden for the seedlings that are observed to be red. Alternatively, the non-default value, such as red, can be applied. Then, the default can be applied to all seedlings to which the non-default value has not been applied Referring now to FIG. 5, at Block 510, a user input of the default value of the at least one of the characteristics for the cells in the matrix that is displayed, is accepted. FIG. 13 illustrates the setting of a default value. In FIG. 13, the characteristic is the observation of flower buds. Upon observation, it can be seen whether or not more samples have flowers buds. Upon observation that most of the plants do not have flower buds, the default value of No can be set in FIG. 13. FIG. 14 illustrates that all of the cells of the matrix can been set to the default value of No. Then, referring to FIG. 5, at Block 520, user input is accepted into at least one of the cells of the matrix that is displayed, of at least one value that is different from the default value. Thus, non-default values can be entered on an exception basis.

Finally, at Block 530, validation also may be provided to accept user input into at least one of the cells of the matrix that is displayed, of at least one corrected value of at least one of the characteristics that change over time for at least one of the samples that corresponds to the at least one of the cells in the matrix that is displayed. It will be understood that validation may be performed in conjunction with or independent of the setting of default values.

Figure 15:
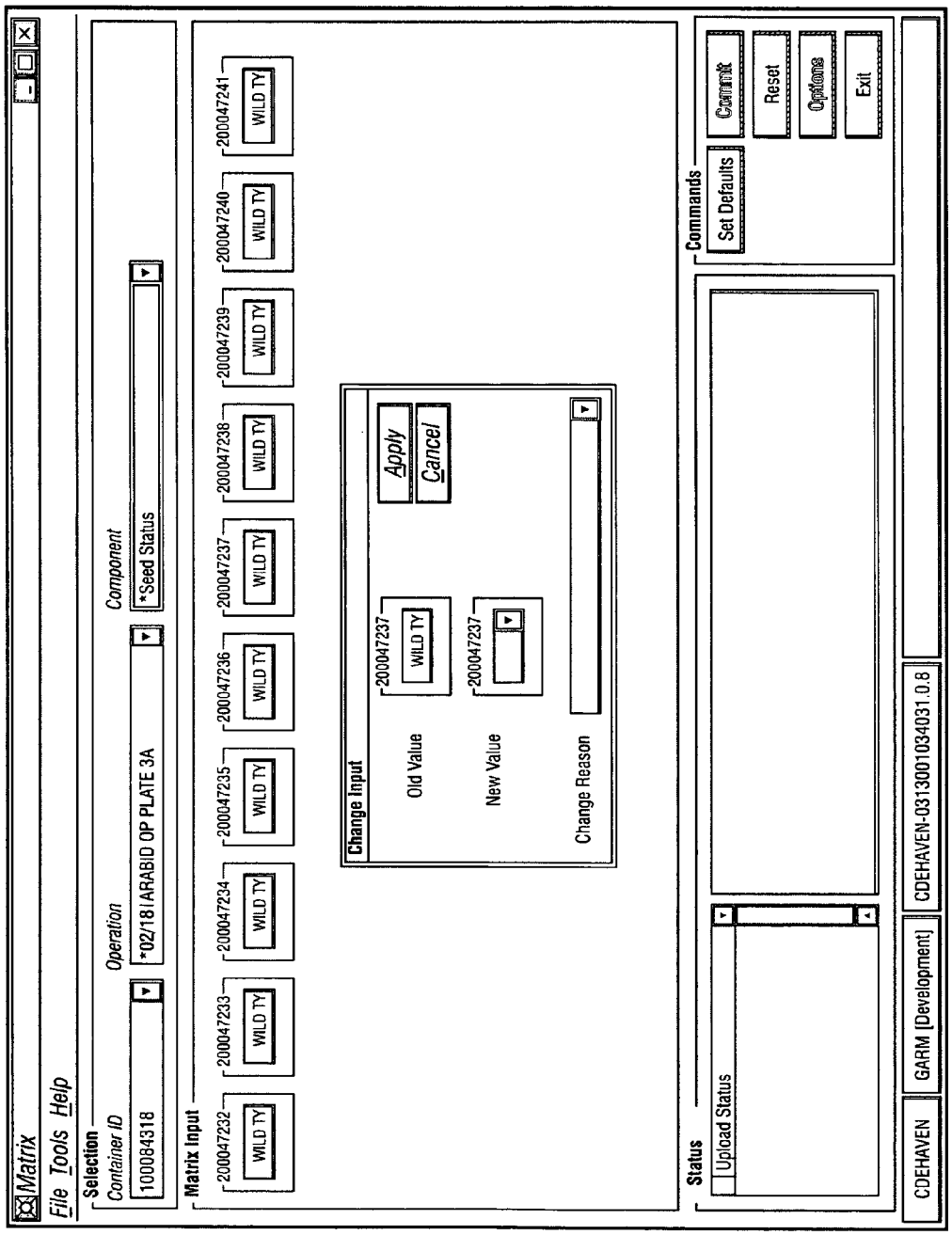
Figure 16:
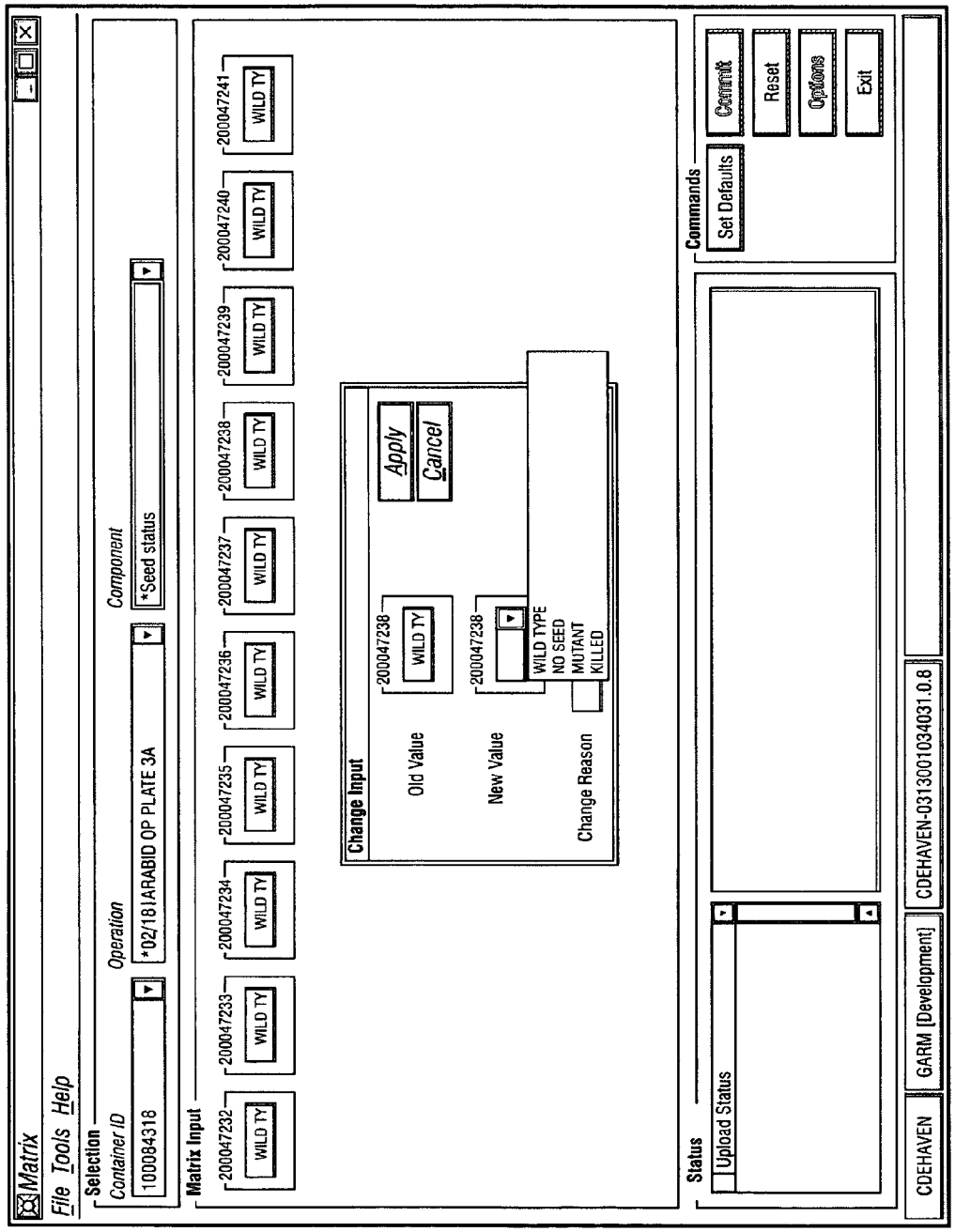
Figure 17:
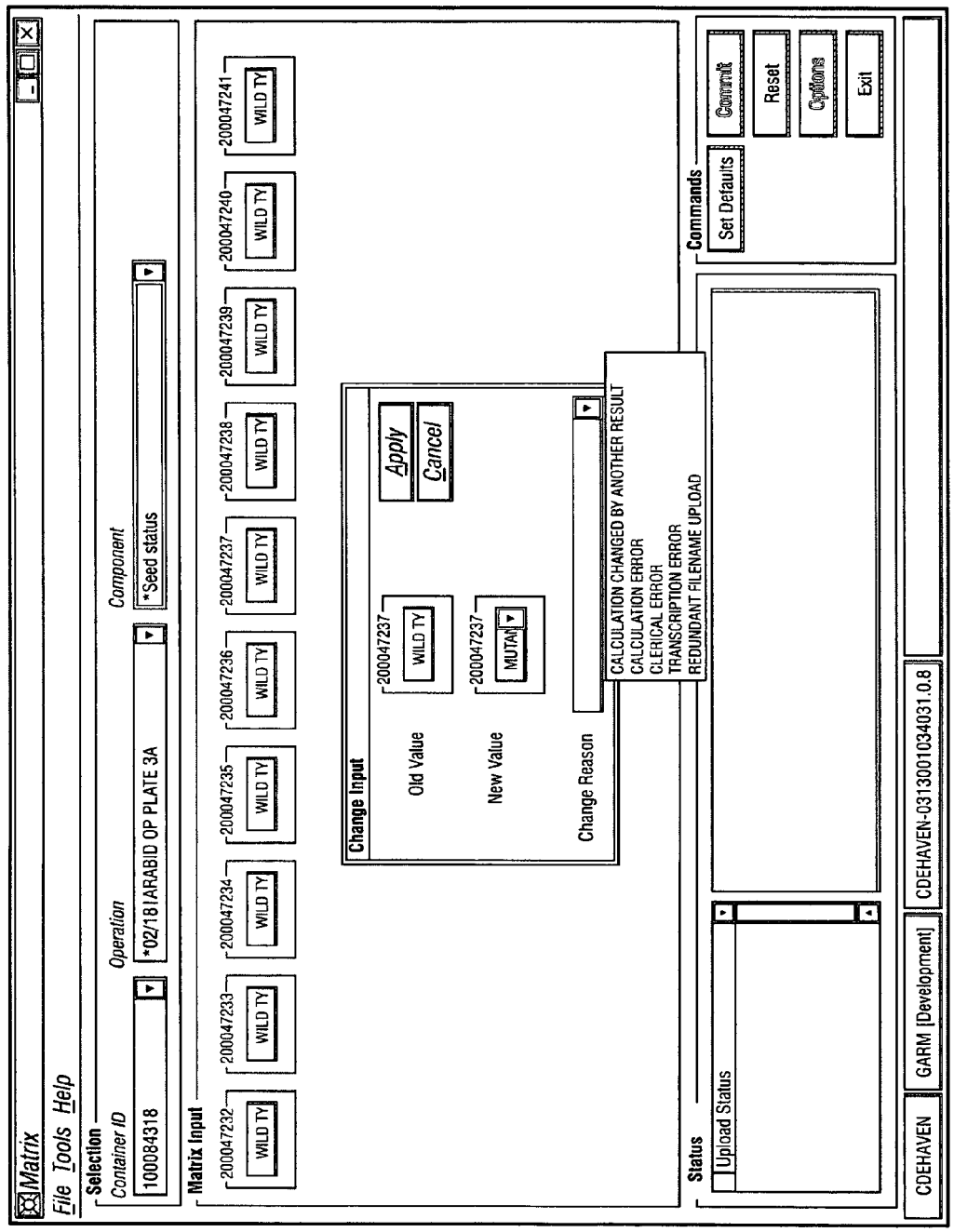
Figure 18:
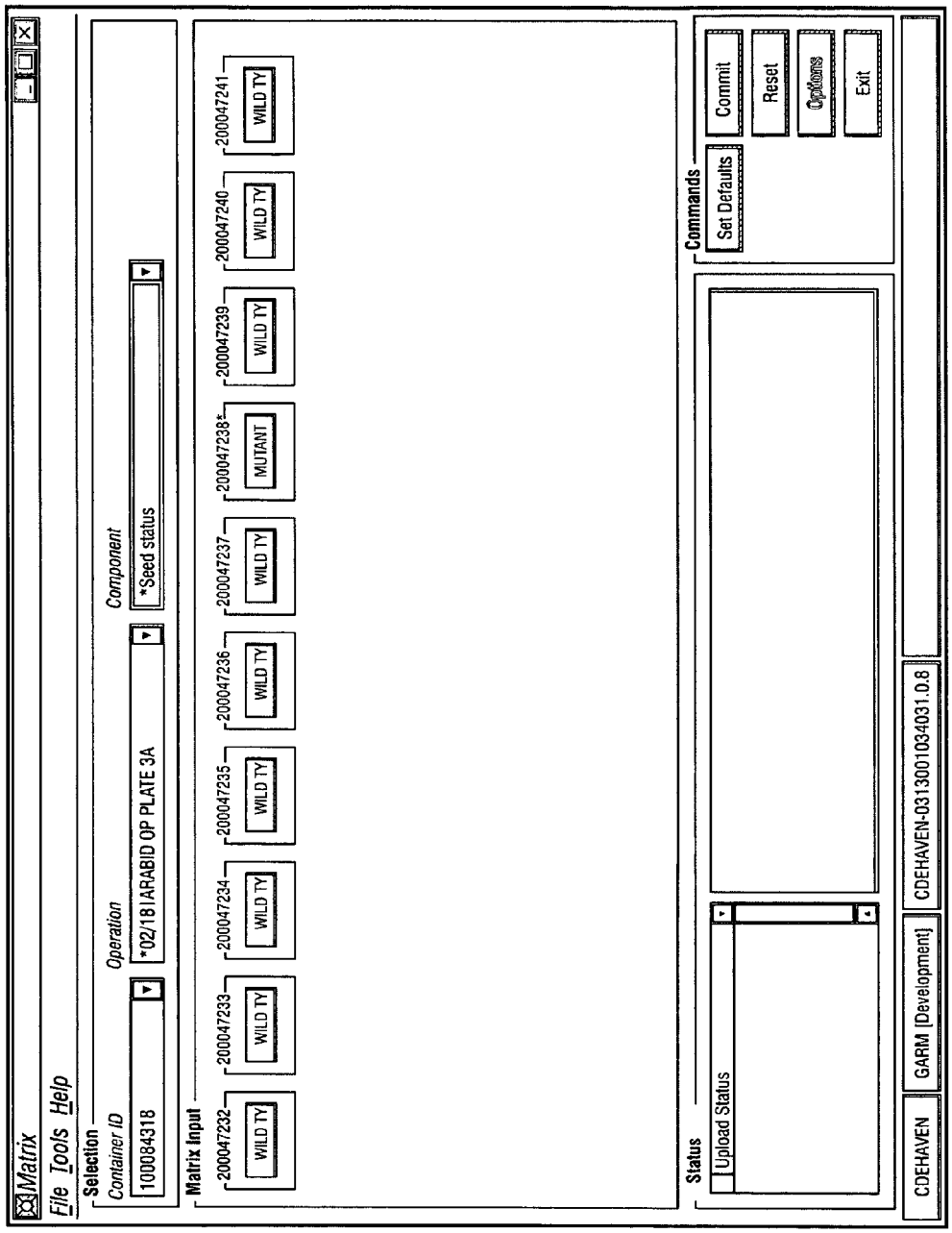

Referring now to FIG. 15, in one example, by double-clicking on one of the cells, a change result screen may be presented. The old value is presented, and a user input for a new value may be accepted. FIG. 16 illustrates the input of a new value. A change reason also may be input at FIG. 17. Once the change is accepted, an asterisk may be provided to the right of the sample identification in the matrix, and the result is changed in the matrix, as shown in FIG. 18. The change then may be committed to the database.

Figure 19:
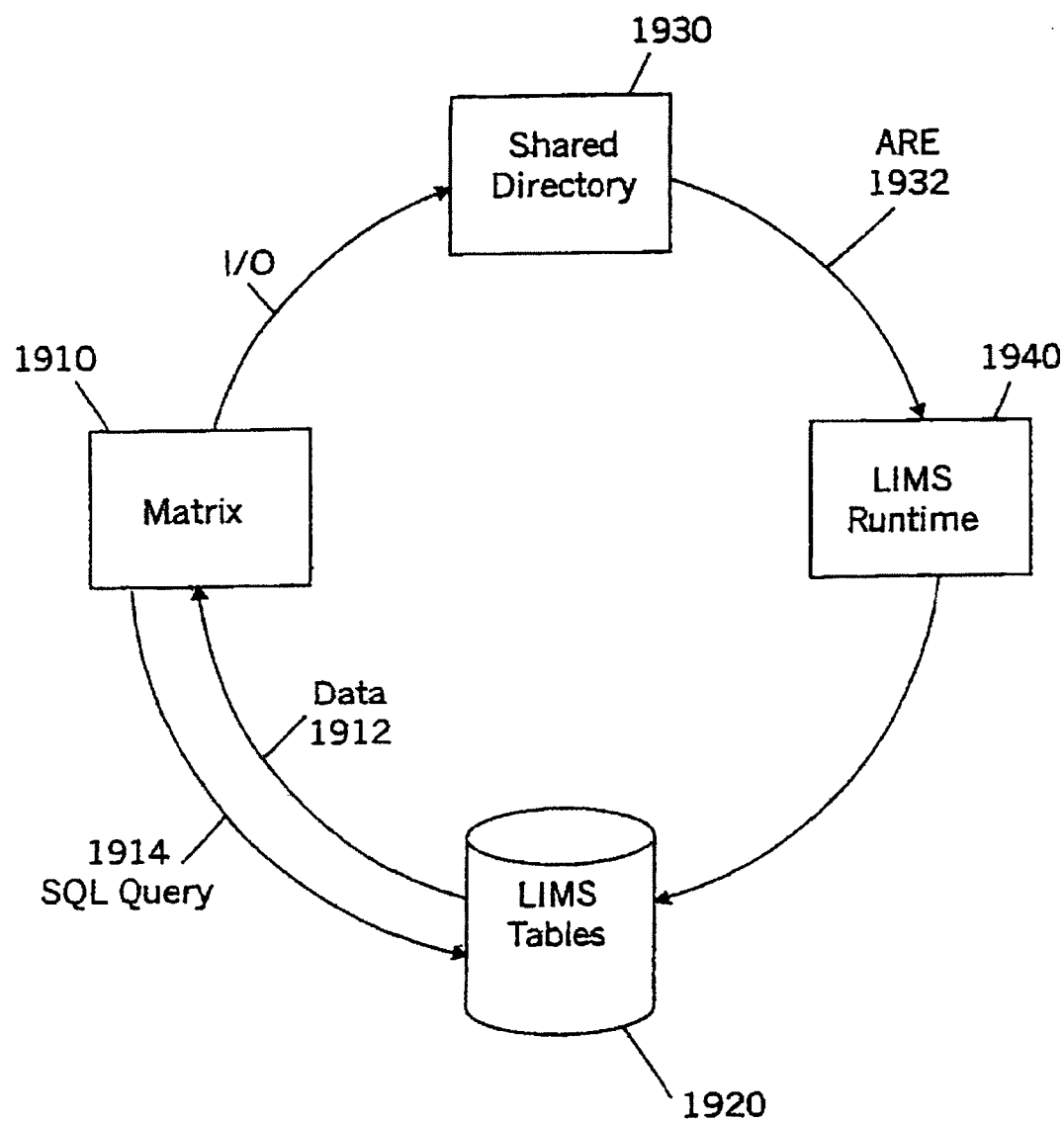
FIG. 19 is a block diagram of matrix data collection according to other embodiments of the present invention.

Referring now to FIG. 19, a functional block diagram of other embodiments of a matrix data collector, for example a matrix data collector 210 of FIG. 2, will be described. FIG. 19 illustrates a relationship between the matrix 1910 and other components of an SQL*LIMS system marketed by Perkin-Elmer Inc. As shown in FIG. 19, the matrix 1910 interacts with LIMS tables 1920, which may be included in an Oracle database, and which may correspond to the database 250 of FIG. 2, using for example an ADO™ connection, marketed by Microsoft, Inc., to directly connect the matrix 1910 to the LIMS tables 1920. This connection may be used to send data 1912 to the matrix from the LIMS table 1920 in a read-only mode, so that the data in the LIMS tables is not corrupted. The matrix 1910 queries the tables, for example using an SQL query 1914, and returns the data 1912, displaying the pertinent data to the user. The matrix 1910 also can write ARE™ (Perkin-Elmer, Inc.) files to a shared directory 1930 on a file system. The LIMS processes then can pick up the files from the shared directory 1930, and insert ARE files 1932 using an LIMS run-time module 1940, which can be a UNIX file. To make new records in the LIMS tables 1920, changed results can perform other database processes. It also will be understood that ARE files need not be used to write data to the database. Rather, data can be written directly into the database, and/or another text file format can be used.

Figure 20:
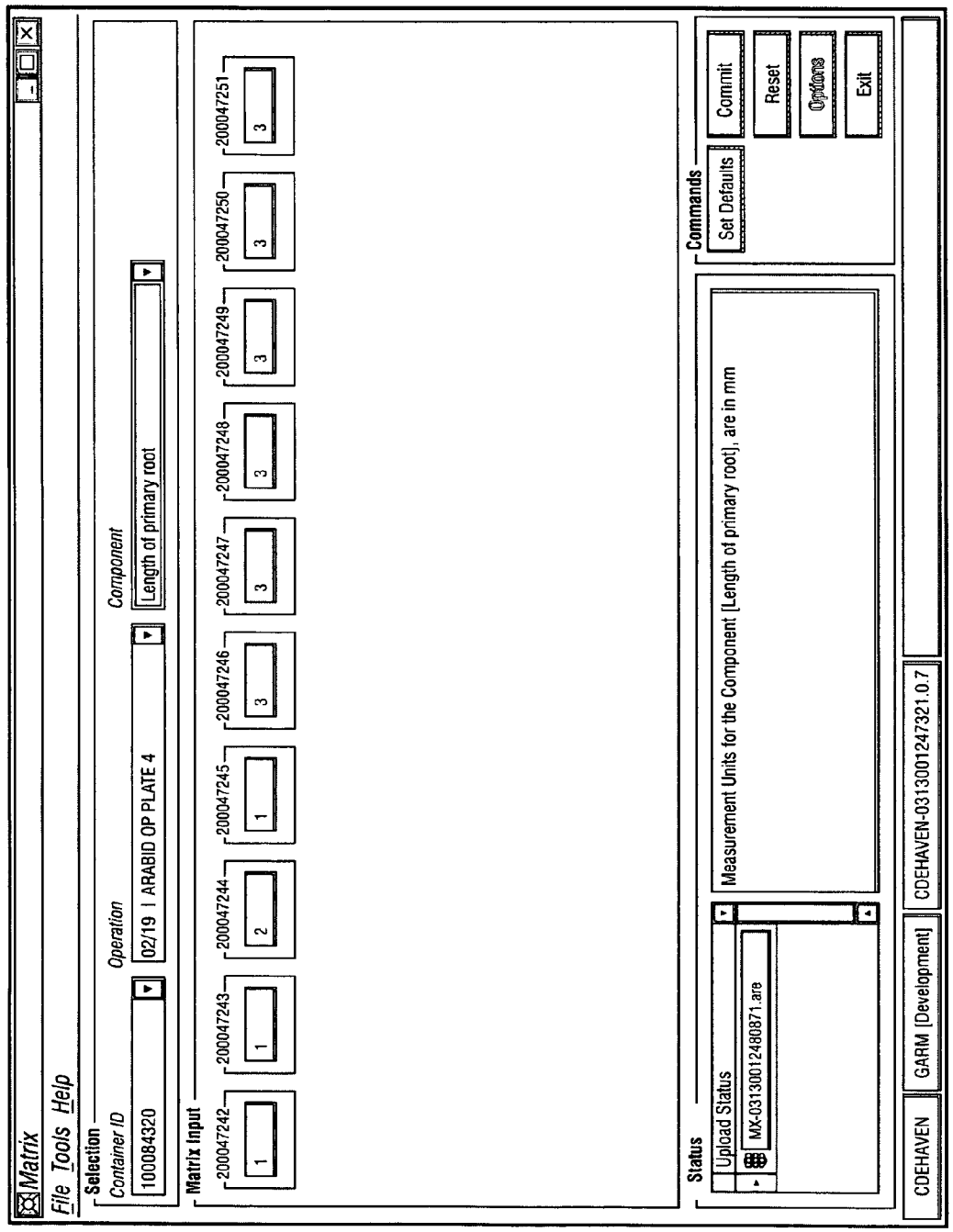
FIGS. 20-26 illustrate additional user interfaces that may be used with matrix data collection according to embodiments of the present invention.
Figure 21:
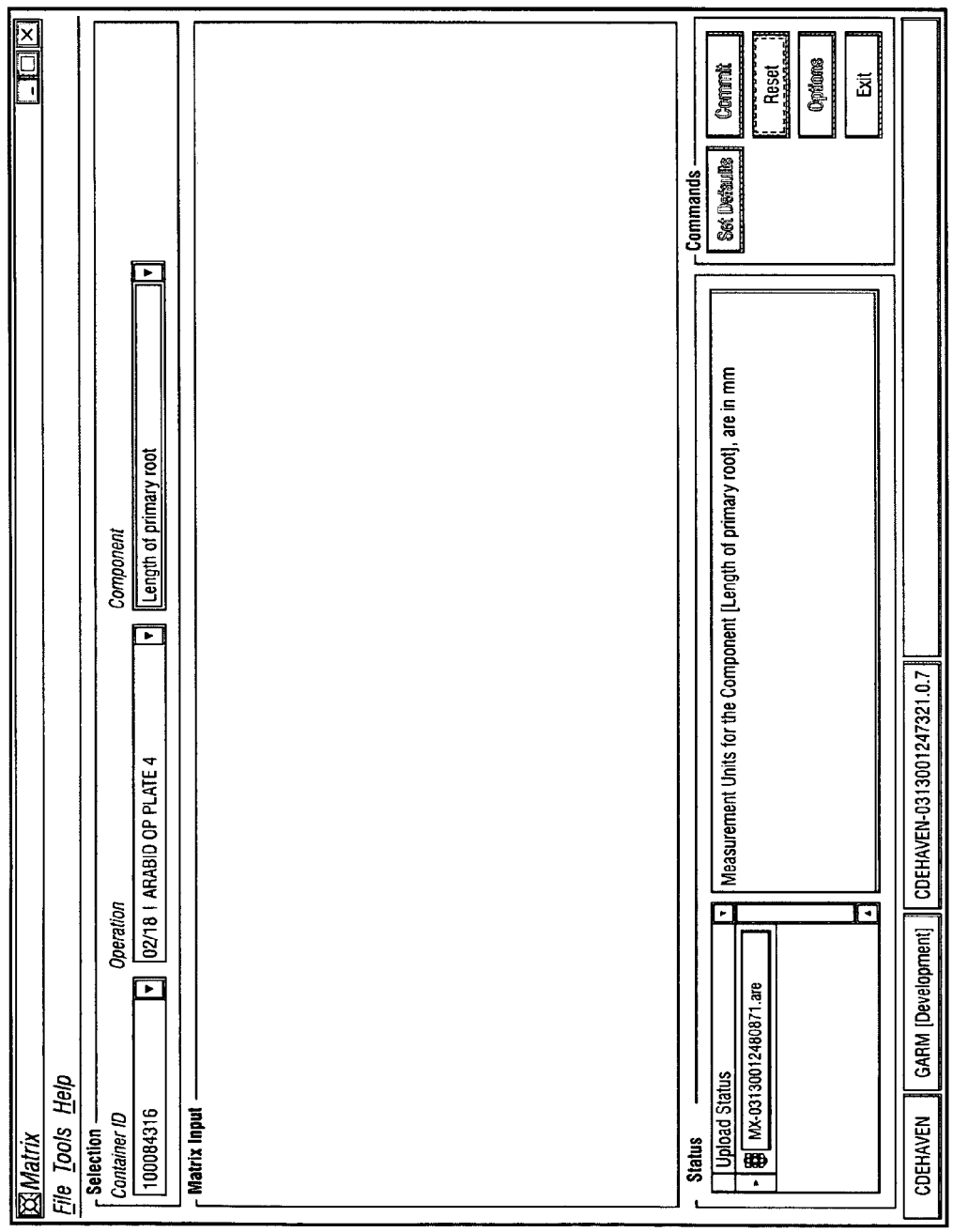
Figure 22:
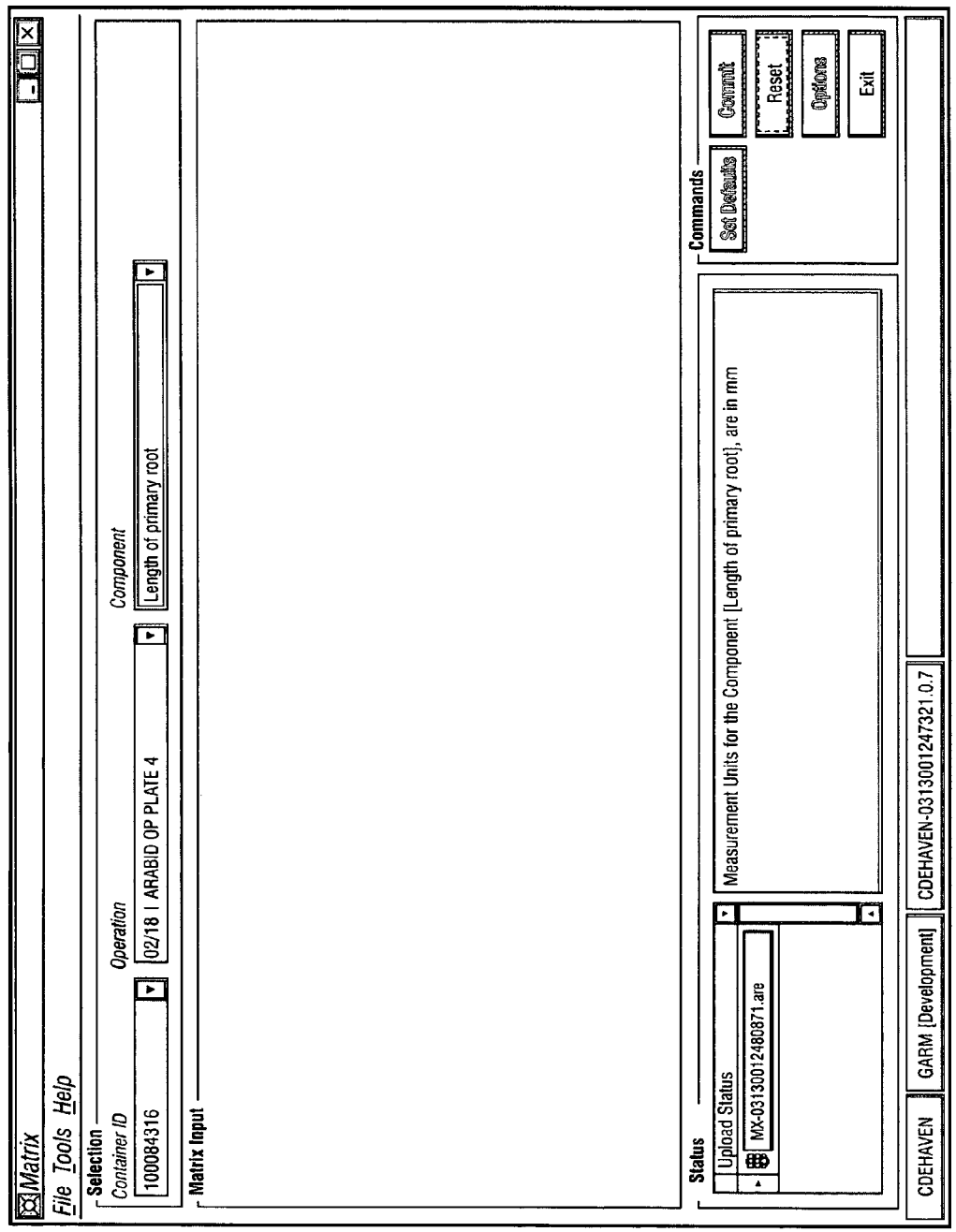

Embodiments of the invention that were illustrated in FIG. 19 can be used to monitor the status of the ARE files 1932. ARE can return status messages if there are problems with the upload. For example, FIG. 20 illustrates a situation where a container ID has been entered, an operation has been selected, a component has been selected, the data has been entered for that component for each sample and a commit button has been pressed to go to the database 1920. In FIG. 21, at the bottom left, in the upload status area, the traffic light has been turned from green (bottom light) to yellow (middle light), meaning that the ARE data 1932 is being processed. The name of the file also is shown. Then, in FIG. 22, once ARE has completed processing the file, the traffic light turns to green (bottom light) again, meaning the file was uploaded successfully.

Figure 23:
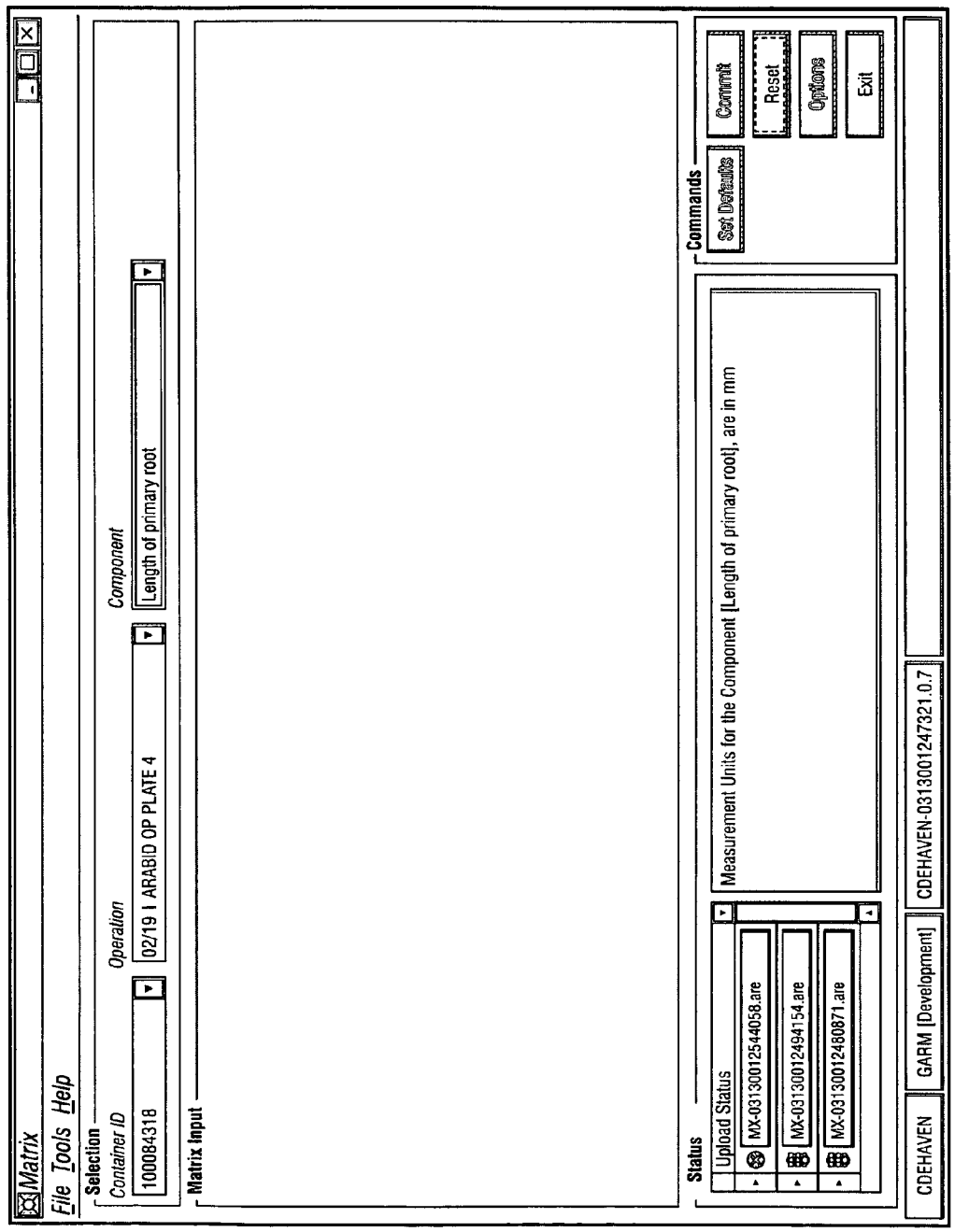
Figure 24:
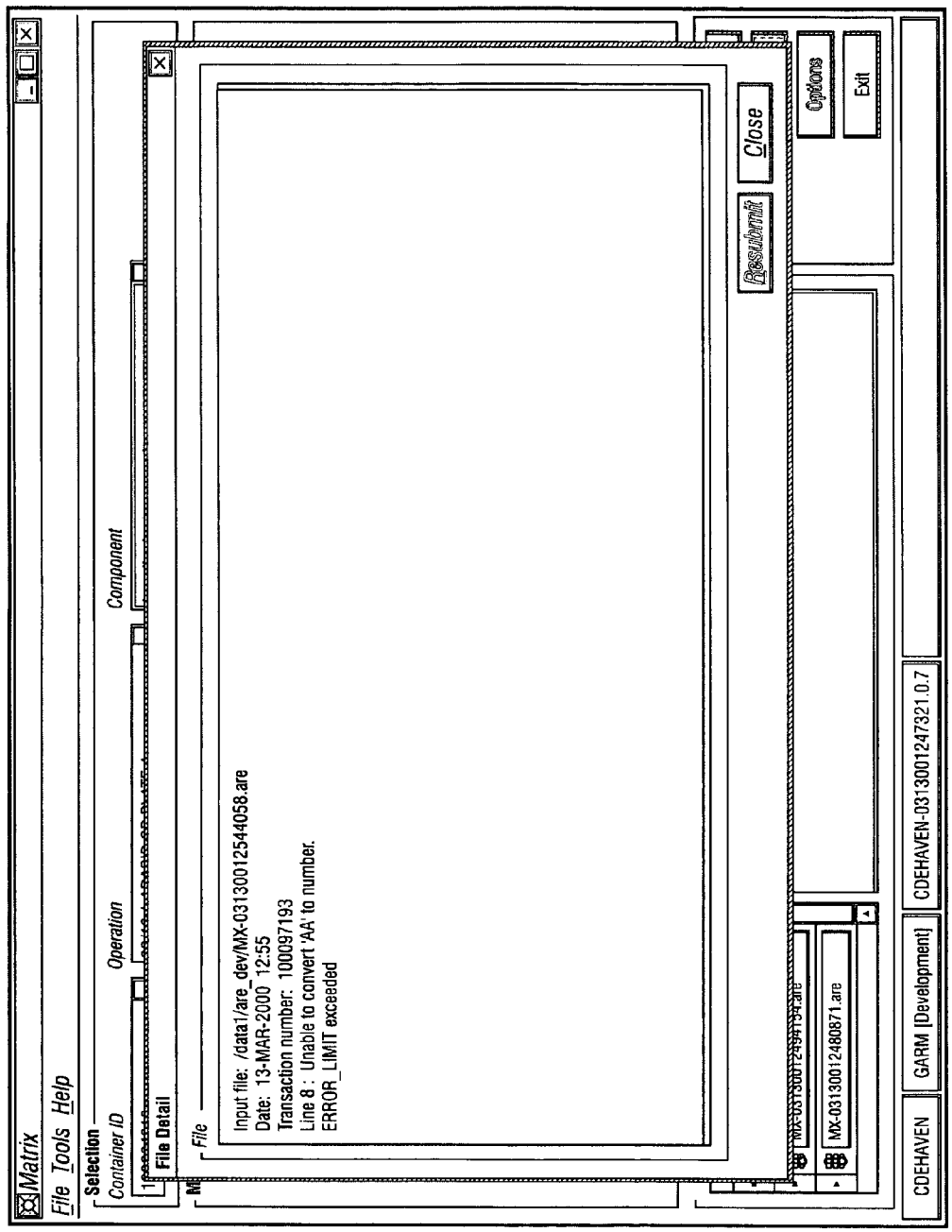
Figure 25:
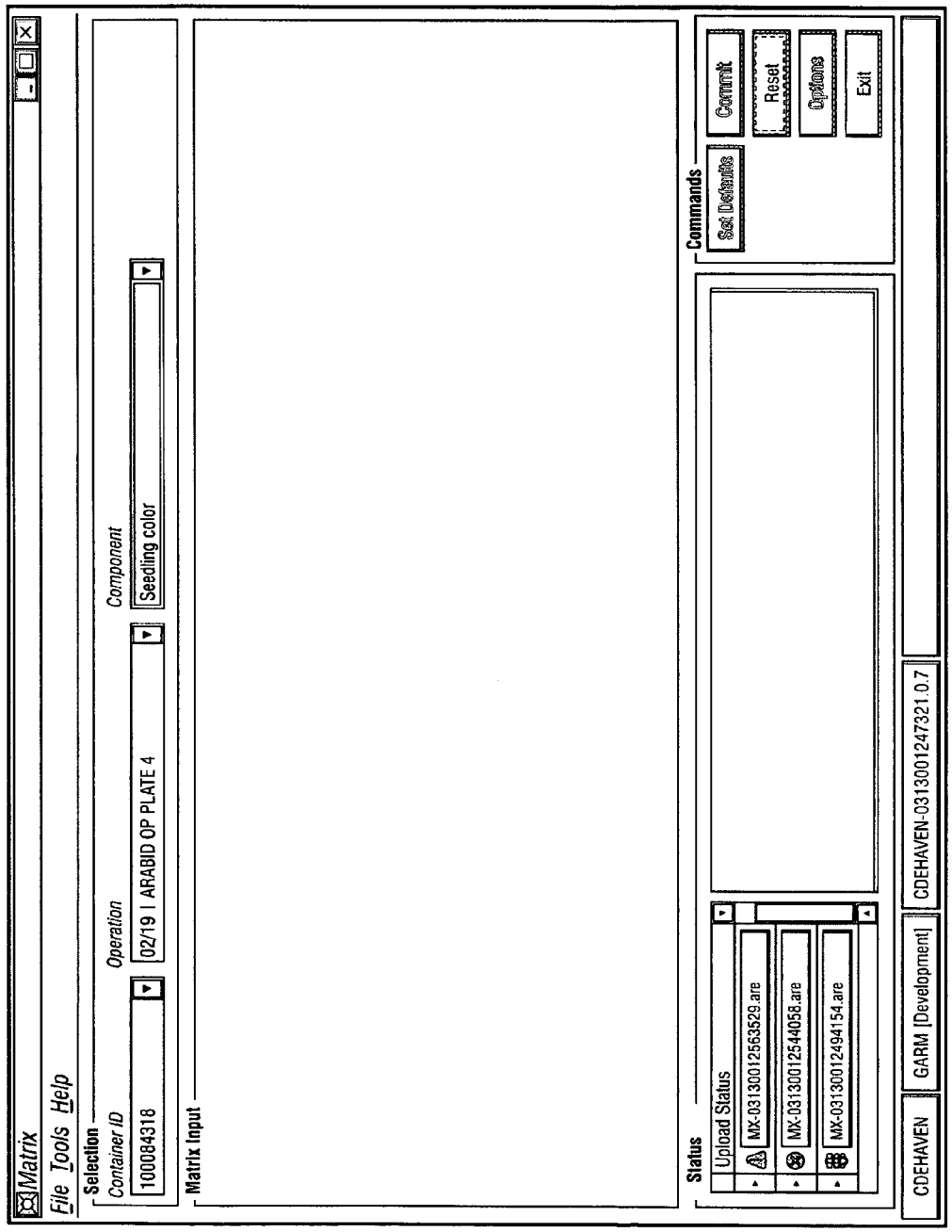
Figure 26:
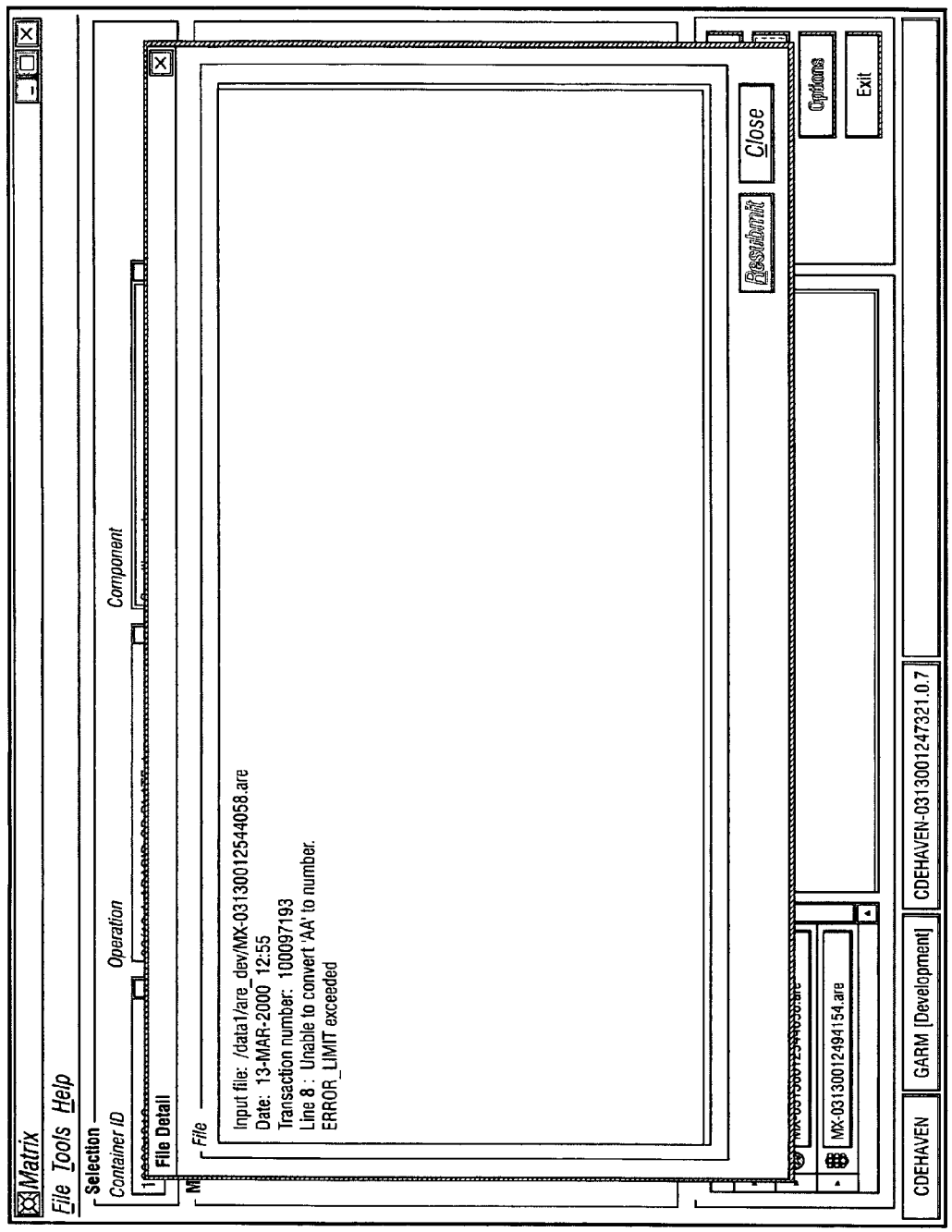

In contrast, FIG. 23 illustrates the detection of errors that come back from ARE. In one case, there may be a complete error with the file. For example, something may be malfunctioning and an upload was not performed. A red "X" may be presented, so that the user can determine that an error has occurred. When the user sees the "X", the user can double-click on the control, and it will bring up a log file that was generated, that came back from ARE. An example is illustrated in FIG. 24. In FIG. 24, the component required an alpha and a numeric, whereas a numeric and an alpha was entered. Alternatively, as shown in FIG. 25, the data may be uploaded to the LIMS tables 1920, but there may be a problem with the data. In this case, a yellow caution symbol "!" was provided, and the user can click on the caution symbol and see the cause of the results, for example as shown in FIG. 26.

A detailed description of dynamic scheduling according to embodiments of the present invention now will be provided. However, prior to describing dynamic scheduling, a description of the desirability of dynamic scheduling in phenotypic analysis of plants will be provided.

As is well known to those having skill in the art, phenotypic analysis refers to characterizing a living system by its physical characteristics. In phenotypic analysis of plants, repeated observations are made on living plants. For example, the observations may include the color of leaves, root length, number of leaves, and the appearance of buds, seeds and root hair. These observations are made repetitively over time.

Moreover, destructive testing also may be performed at various points in time. Thus, a plant may meet a certain growth stage in its life cycle, at which point destructive testing may be performed to determine, for example, the dry weight of the leaves or the number of seeds in its leaf. This destructive testing is only performed once, because the plant is killed.

Finally, phenotypic measurements of plants also may be interested in growth stage determination. More specifically, plants generally follow a predictable life cycle of seed, sprout, root breaks through the soil, bud development, bud opening, etc. The occurrence of these points may be important in determining unusual growth patterns, so that certain measurements may be made based on these growth stages. Finally, population-based decisions may need to be performed to try to determine when a growth stage occurs, so that minor variants in a given plant can be canceled out or averaged out by the population.

Figure 27:
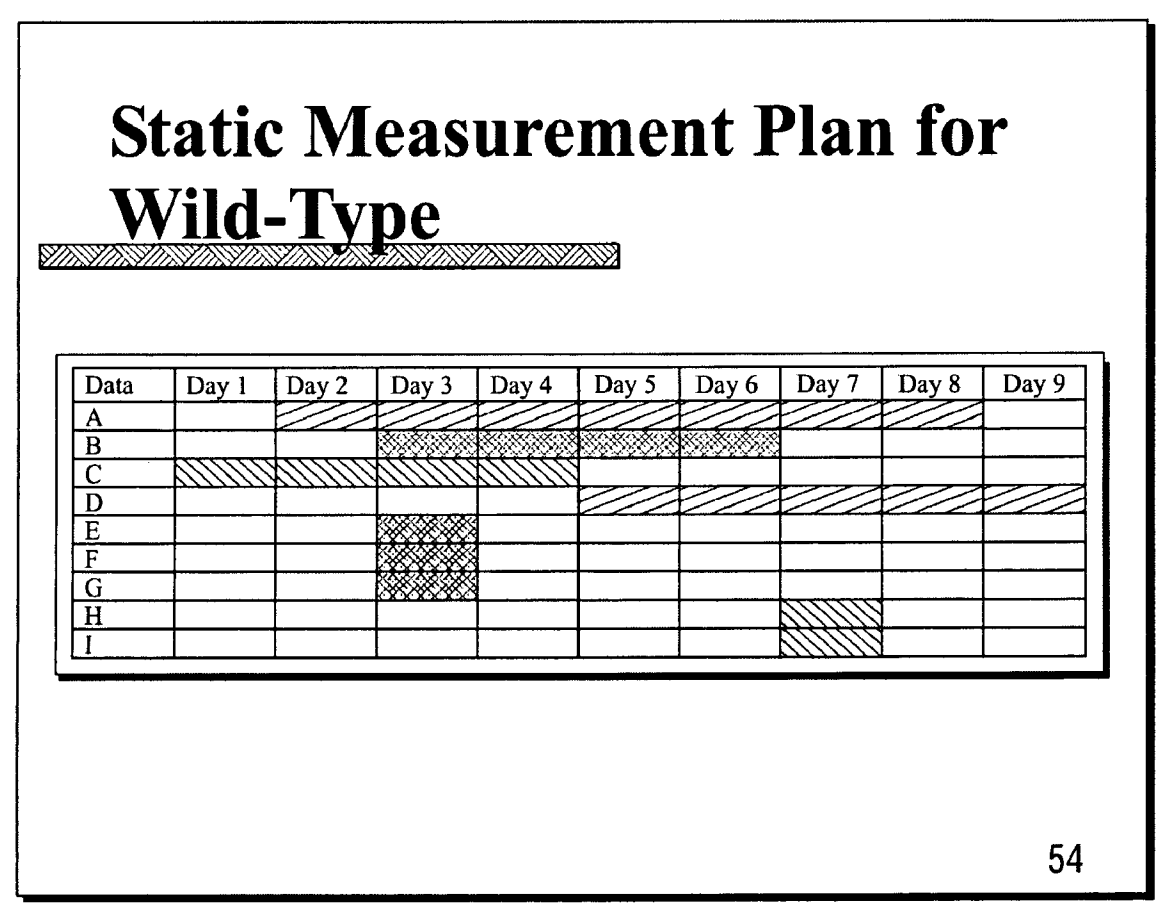

FIG. 27 is a simplified representation of a data collection plan that might be applied to a plant. As shown, a particular data collection A is started at Day 2, and collected daily through Day 8. The data collection A may be a test data collection such as color or texture. Other tests start and stop at predictable times. Moreover, there may be a battery of extensive tests that are desired at certain points in the growth stage, for example as represented by tests E, F and G at Day 3, and by tests H and I at Day 7.

Static data collection as described in FIG. 27 may be acceptable if only stable wild-type plants were being data collected. However, phenotypic studies in plants typically study unpredictable mutations in plants, to determine how these mutations change the phenotype. Accordingly, the data collection plan may be dynamically adjusted based on the growth pattern of particular mutant plants. For example, referring back to FIG. 27, it may be desirable to extend the test C past Day 4, and it may have been desirable to perform the test D earlier, due to the appearance of an earlier characteristic. Finally, it also may have been desirable to perform the block of tests at Day 3 and Day 7 earlier or later, depending on the characteristics that were observed.

Figure 28:
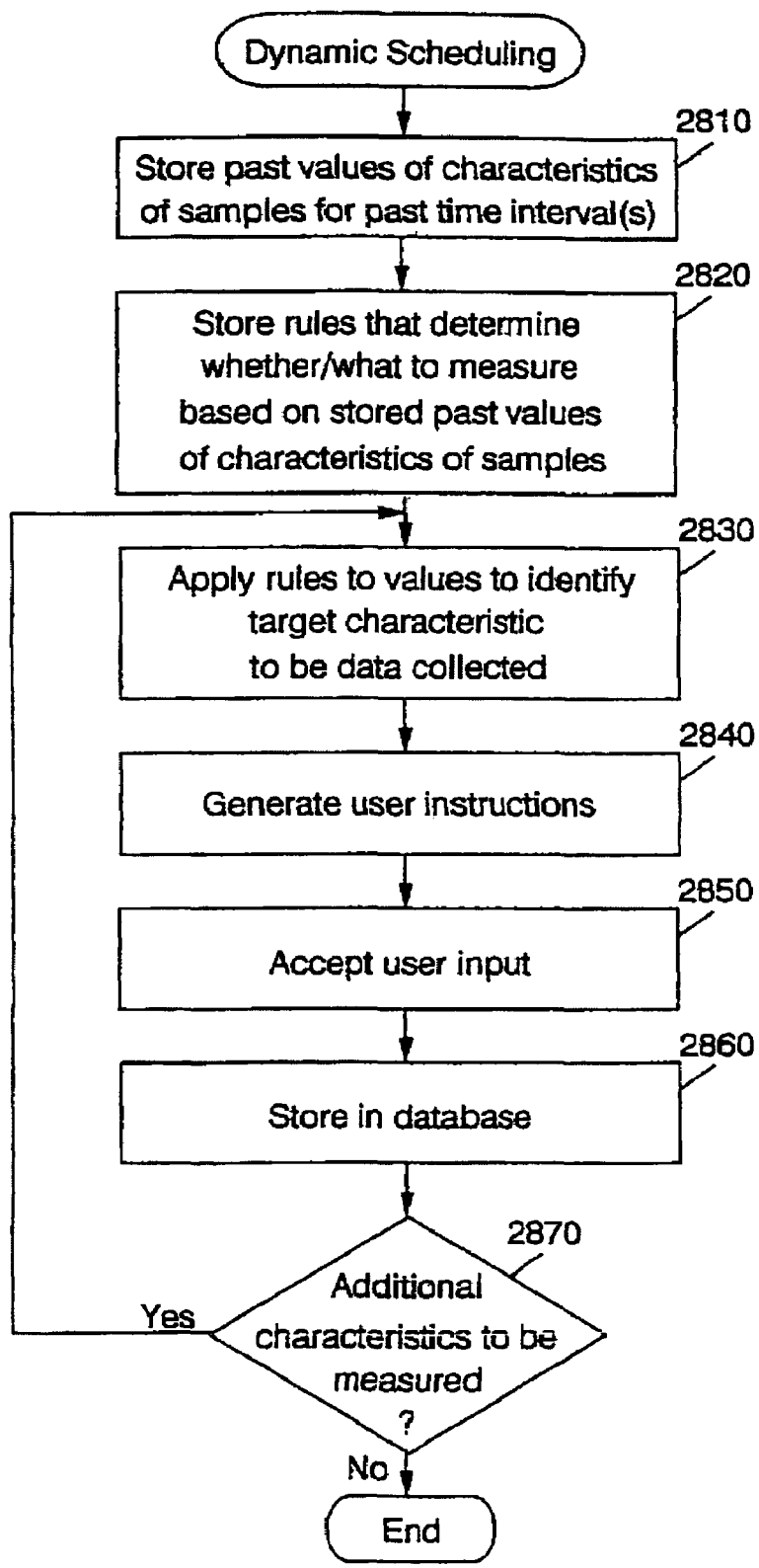
FIG. 28 is a flowchart of operations that are performed for dynamic scheduling according to embodiments of the present invention.

Referring now to FIG. 28, operations that may be performed for dynamic scheduling according to embodiments of the invention now will be described. These operations may be performed by the dynamic scheduler 220 of FIG. 2. These operations may be used to schedule data collection of characteristics of a plurality of samples, wherein values of the characteristics change over time.

Referring now to FIG. 28, at Block 2810, a plurality of past values of the characteristics of the plurality of samples that were data collected during at least one past time interval is stored in a database, such as the database 250 of FIG. 2. At Block 2820, a plurality of rules, such as the rule set 240 of FIG. 2, are generated and stored, for example, in a rule base. The rules determine whether a characteristic of a sample is to be data collected and, if so, identify the characteristic which is to be data collected, based on values of characteristics of samples. It will be understood by those having skill in the art that the operations of Blocks 2810 and 2820 may be reversed in sequence and/or may overlap.

Still referring to FIG. 28, at Block 2830, the plurality of rules are applied to the plurality of past values that are stored in the rule base, to identify target samples to be data collected from the plurality of samples, and to identify at least one target characteristic to be data collected for the target samples that are identified. Then, at Block 2840, user instructions are generated to collected data for the at least one target characteristic to be data collected in the target samples to be data collected. The user instructions may be in the form of a matrix, as was described in detail above. However, other forms of user instructions that do not employ a matrix also may be generated.

Still referring to FIG. 28, at Block 2850, user input of at least one value of the at least one target characteristic to be data collected is accepted. The user input may use a matrix as described above, or may use other user input techniques. At Block 2860, the at least one target value of the at least one target characteristic to be data collected in the target samples to be data collected is stored in the database. Finally, at Block 2870, if additional characteristics are to be measured, then the applying, generating, accepting and storing at Blocks 2830-2860 are repeatedly performed during a plurality of time intervals.

Accordingly, dynamic scheduling according to embodiments of the present invention can take the data that has been obtained and apply rules to the data, to thereby derive unique data requirements that respond to the data that was obtained. Dynamic scheduling can provide a variable identification of a target characteristic which is to be data collected. This variable identification of a target characteristic which is to be data collected also is referred to herein as a "variable components list". Instead of a static measurement plan that always asks the same question, dynamic scheduling can change a target characteristic list from sample to sample, in any particular data collecting operation.

FIG. 29 schematically illustrates an application of dynamic scheduling to the data of FIG. 27. In FIG. 29, the characteristic C is data collected for at least one additional day, Day 5. The characteristic D is data collected earlier, at least at Day 4. The characteristics E, F and G are data collected earlier, and the characteristics H and I are data collected later. These changes may be generated based on the application of the stored rules to the past values that were obtained.

Figure 30:
FIGS. 30-32 illustrate other applications of dynamic scheduling according to embodiments of the present invention.

FIG. 30 illustrates a particular example of extinguishing data collection of a characteristic. In particular, some types of data collection do not apply to a plant past a certain point. For example, a characteristic may be, "Has a plant developed buds?". The result is No on Day 3, No on Day 4, No on Day 5 and Yes on Day 6. There is then no need to data collect that characteristic for that particular plant on Day 7 or Day 8, as that would be unnecessary data collection.

Figure 31:

FIG. 31 illustrates another example of dynamic scheduling, wherein a data collection of a target characteristic is started. There are some characteristics that cannot logically occur before other characteristics occur. For example, if the characteristic is how many flowers are on a bud, then the bud will have to be open first. There is no point in data collecting these characteristics until it is logical for these characteristics to be relevant. Thus, in FIG. 31, characteristic B is data collected for the first time on Day 6, when it has been determined that a particular characteristic is sensible to be data collected, based on the characteristic implied by the value of A.

Figure 32:

FIG. 32 illustrates starting an independent method based on the past value of the characteristic that was stored earlier. In particular, it may be desirable to perform rather complex data collection where a "spur" data collection may begin based on occurrence of an event. For example, once a plant has budded, it may be desirable to perform a number of data collections of characteristics that are now on their own pathway and independent of the core data collection that is being made on the plant. Thus, as shown in FIG. 32, on Day 3, a critical growth stage was determined for characteristic A, and starts independent data collections E, F, G, H and I based on the data collection at Day 3.

Since large numbers of samples generally are being measured, the rules may be based on a percentage of the samples having a past value of a characteristic during a past time interval. For example, a rule may be included that begins or terminates data collection of a characteristic in a sample based on a percentage of the samples having a value of that characteristic or of another characteristic during a past time interval. Alternatively, data collection of the characteristic may begin or terminate based on a percentage of the samples failing to have that characteristic or another characteristic during a past time interval. Moreover, all of the samples need not be included in the percentage determination. For example, the sample may be contained in an array of samples, such as a flat. The rules can include a rule that begins or terminates data collection of a characteristic based on a percentage of the samples in the array that contains the sample in question, either including or failing to include that characteristic or another characteristic during a past time interval.

FIG. 33 graphically illustrates an example of rules that are based on percentages. In FIG. 33, the characteristics are referred to as "components". As shown in FIG. 33, on Day 1, three components are tested. The results are entered into the database once the task is complete. The rules shown in FIG. 33 then are applied to data that was entered as a result of the task. As shown in FIG. 33, one rule is when 50% of the samples for a component 1 are greater than or equal to n, then component 5 is activated and component 1 is deactivated. The second rule is that when 50% of the samples of component 2 equal a value, then component 2 is deactivated. The third rule is when 75% of the samples for component 5, is greater than a particular value, then some components are activated and others are deactivated.

As shown in FIG. 33, on Day 1 there are three components, and their values are evaluated. On Day 2, there is a new component list that the user will data collect as a result of dynamic scheduling. Similar operations are performed at the end of Day 2 relative to components 2, 3, 4 and 5, so that on Day 3, components 2, 3, 4 and 5 are again data collected. Similarly, on Day 4, components 2, 3, 4 and 5 are data collected, and on Day 5, components 6, 7 and 8 are data collected based on application of the rules to the newly entered data.

Other embodiments of dynamic scheduling according to the present invention now will be described. These embodiments of dynamic scheduling may include using a rule set that includes the fields that are shown in Table 1. Table 1 consists of 4 rows and 20 columns, and spans 8 pages.

TABLE 1

| DCC_ID | PARENT_DCC_ID | SEQUENCE | DCC_VERSION | STATUS | STUDY_ID | RESULT_PLAN_ID |
|---|---|---|---|---|---|---|
| 1000000014 | 1000000002 | 21 | 1 | MODIFIED | 100010269 | 105008522 |
| 1000000003 | 1000000002 | 10 | 1 | MODIFIED | 100010269 | 105008522 |
| 1000000021 | 1000000004 | 26 | 1 | MODIFIED | 100010269 | 105008522 |

| CONDITION | ACTION | EXIT_WHEN_TRUE | HIDE_PARAMETER | RUN_ONCE |
|---|---|---|---|---|
| 1000000014 | A | N | Y | N |
| GROWTH STAGE 110 DAY | A | N | N | Y |
| IMAGE ROSETTE | A | N | Y | Y |

| MAX_TASK_SEQUENCE | SCOPE_LEVEL | METHOD |
|---|---|---|

TABLE 1-continued

| | | |
|---|---|---|
| 36 | SUBMISSION SUBMISSION SAMPLE | ARABIDOP 97 SOIL CORE/ARABIDOP 97 SOIL GROWTH STAGES/ ARABIDOP 97 SOIL CORE/ARABIDOP 97 SOIL GROWTH STAGES/ ARABIDOP 97 SOIL IMAGES/ |

| START_SQL | START_SCOPE_SQL |
|---|---|
| SELECT Count(DISTINCT s.sample_id)<br>FROM nais_samples s, nais_results r<br>WHERE r.sample_id = s.sample_id<br>AND s.sample_type = 'ORANGE'<br>AND r.submission_id = :submission_id<br>AND r.text_value = 'Y'<br>AND r.component = 'Can flower buds be seen?'<br>AND r.result_version = (SELECT Max(result_version)FROM nais_results WHERE result_id = r.result_id)<br>SELECT Count(DISTINCT s.sample_id)<br>FROM nais_samples s, nais_results r<br>WHERE r.sample_id = s.sample_id<br>AND s.sample_type = 'ORANGE'<br>AND r.submission_id = :submission_id<br>AND r.number_value >= 10<br>AND r.component = 'Rosette leaves > 1 mm in length'<br>AND r.result_version = (SELECT Max(result_version)FROM nais_results WHERE result_id = r.result_id)<br>SELECT Count(DISTINCT r.sample_id)<br>FROM nais_tasks t, nais_results r<br>WHERE t.task_id = r.task_id<br>AND t.operation = 'IMAGE-WHOLE ROSETTE ON SOIL'<br>AND r.submission_id = :submission_id<br>AND r.sample_id = :sample_id<br>AND r.text_value = 'Y'<br>AND r.component = 'Picture taken'<br>AND r.result_version = (SELECT Max(result_version)FROM nais_results WHERE result_id = r.result_id) | SELECT Count(DISTINCT s.sample_id)<br>FROM nais_samples s, nais_results r<br>WHERE r.sample_id = s.sample_id<br>AND s.sample_type = 'ORANGE'<br>AND r.submisson_id = :submission_id<br>AND r.component = 'Can flower buds be seen?'<br>AND r.result_version = (SELECT Max(result_version)FROM nais_results WHERE result_id = r.result_id)<br><br>SELECT Count(DISTINCT s.sample_id)<br>FROM nais_samples s, nais_results r<br>WHERE r.sample_id = s.sample_id<br>AND s.sample_type = 'ORANGE'<br>AND r.submission_id = :submission_id<br>AND r.component = 'Rosette leaves > 1 mm in length'<br>AND r.result_version = (SELECT Max(result_version)FROM nais_results WHERE result_id = r.result_id) |

| STOP_SQL | STOP_SCOPE_SQL |
|---|---|
| SELECT Count(DISTINCT s.sample_id)<br>FROM nais_samples s, nais_results r<br>WHERE r.sample_id = s.sample_id<br>AND s.sample_type = 'ORANGE'<br>AND r.submission_id = :submission_id<br>AND r.text_value = 'Y'<br>AND r.component = 'Is first flower open?'<br>AND r.result_version = (SELECT Max(result_version)FROM nais_results WHERE result_id = r.result_id) | SELECT Count(DISTINCT s.sample_id)<br>FROM nais_samples s, nais_results r<br>WHERE r.sample_id = s.sample_id<br>AND s.sample_type = 'ORANGE'<br>AND r.submission_id = :submission_id<br>AND r.component = 'Is first flower open?'<br>AND r.result_version = (SELECT Max(result_version)FROM nais_results WHERE result_id = r.result_id) |

| PERCENTAGE_REQUIRED |
|---|
| 50 |
| 50 |

The fields are defined as shown in Table 2:

TABLE 2

| Field | Function | Comments |
|---|---|---|
| Dcc_id | Unique record identifier. Relates to pg1_dcc_detail | NUMBER(10) NOT NULL |
| Parent_dcc_Id | Specifies that a specific dcc_id must have occurred before the current one is evaluated | NUMBER(10) |
| Sequence | The order in which rules are evaluated | NUMBER(3) NOT NULL |
| Dcc_Version | Version of the set of rules. | NUMBER(3) NOT NULL |
| Status | Can be CURRENT or MODIFIED, specifies which is the current set of rules that will be applied to new data | VARCHAR2(10) NOT NULL |
| Study_id | Study in which to do the evaluation on | NUMBER(10) NOT NULL |
| Result_plan_id | Result plan to use when creating components. | NUMBER(10) NOT NULL |
| Condition | Rule identifier. This will be inserted as a parameter either on the sample or the submission when the rule evaluates to true | VARCHAR2(20) NOT NULL |
| Action | Can be A for activate or R for reject | VARCHAR2(1) |
| Exit_when_true | Stop evaluating any more rules if the current rule is true. | VARCHAR2(1) |
| Hide_parameter | Hide the created parameter from the user if the current rule is true | VARCHAR2(1) |
| Run_once | Only evaluate the rule until it is true | VARCHAR2(1) |
| Max_task_sequence | Maximum sequence of the task allowed before a rule is forced to be true. | NUMBER(3) |

TABLE 2-continued

| Field | Function | Comments |
|---|---|---|
| Scope_level | Can be SAMPLE or SUBMISSION Determines whether or not to base the evaluation on a population or each sample individually | VARCHAR2(10) |
| Method | Limits the rule evaluation only to those tasks with the same methods as the calling task | VARCHAR2(100) |
| Start_sql | SQL statement to count the number of samples that pass criteria. For SAMPLE level, the result is either 1 or 0 | VARCHAR2(2000) |
| Start_scope_sql | SQL statement to count the number of samples for the criteria that is being evaluated in Start_sql. | VARCHAR2(2000) |
| Stop_sql | Same as Start_sql but will stop the activation of new components when evaluated to true | VARCHAR2(2000) |
| Stop_scope_sql | SQL statement to count the number of samples for the criteria that is being evaluated in Stop_sql | VARCHAR2(2000) |
| Percentage_required | The percentage of the population required to activate the creation of components Only applies to those being evaluated at the submission level. | NUMBER(3) |

Figure 34:
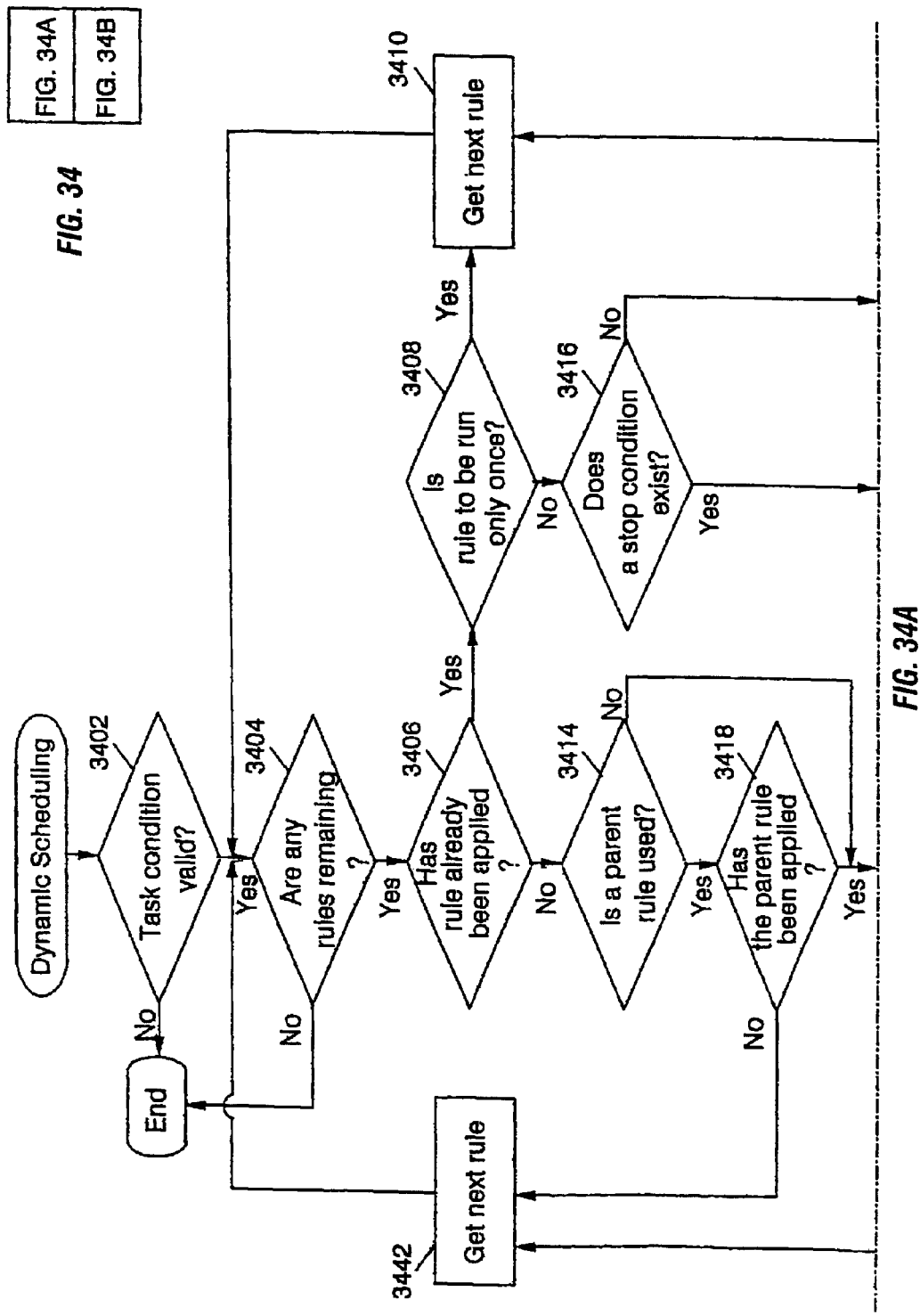
FIG. 34, is a flowchart illustrating dynamic scheduling according to other embodiments of the present invention.
Figure 34B:
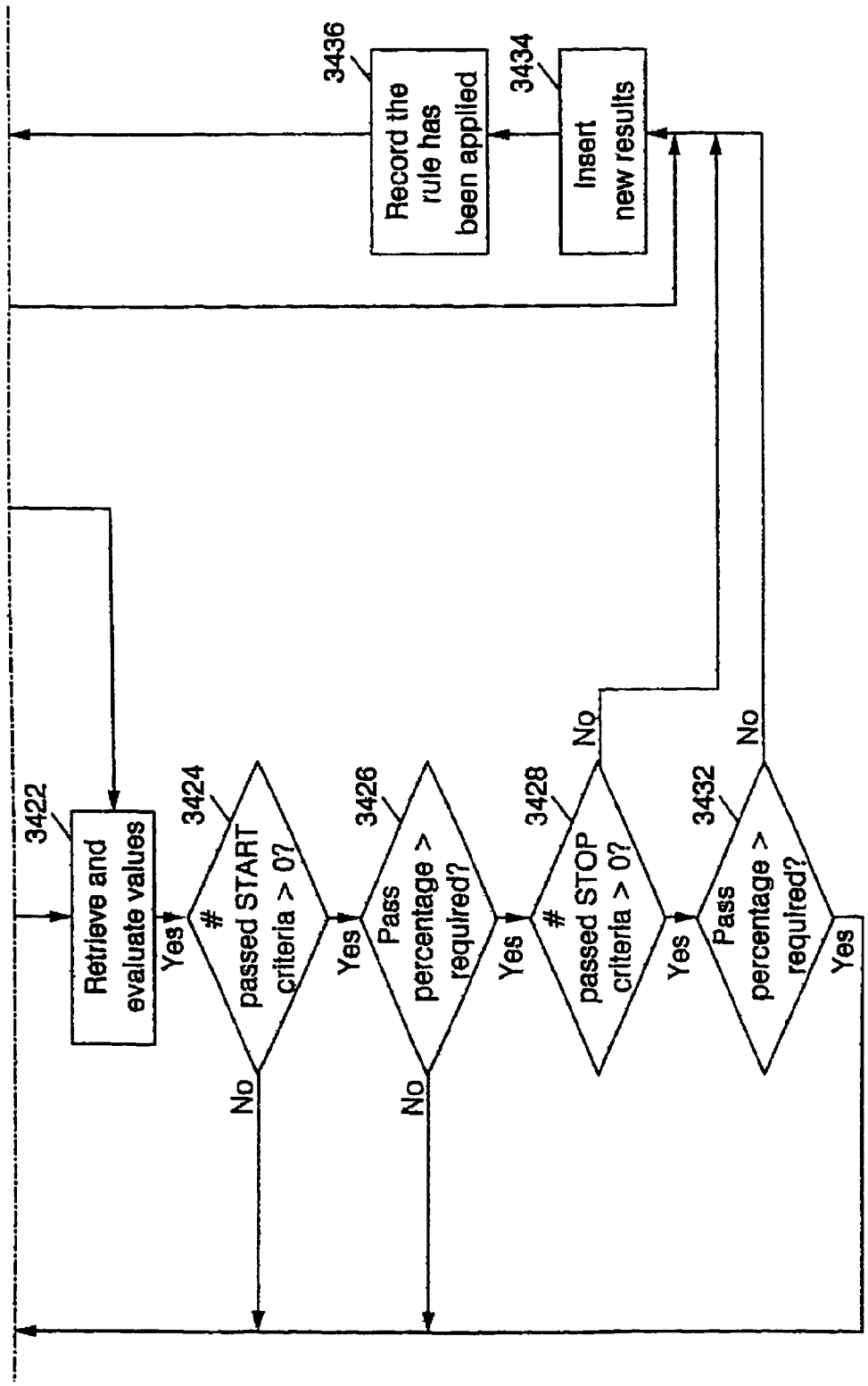

FIGS. 34A and 34B, which when placed together as shown form FIG. 34, is a flowchart of operations that may be performed for dynamic scheduling according to embodiments of the present invention, using the rule set of Table 1. Referring now to FIG. 34, if a task condition is valid at Block 3402, a test is made at Block 3404 as to whether there are any rules remaining. More particularly, the rules are applied sequentially to the data values that are stored in the database, until no more rules remain, at Block 3404. At Block 3406, a test is made as to whether the rule already has been applied. If yes, a test is made at Block 3408 as to whether the rule is to be run only once and, if so, at Block 3410, the next rule is obtained. If the rule is not to be run only once at Block 3408, but a stop condition exists at Block 3416, then the values are retrieved and evaluated for the rule at Block 3422.

Referring again to Block 3406, if the rule has not yet been evaluated, then a test is made at Block 3414 as to whether a parent rule is used. If yes, then a test is made at Block 3418 as to whether the parent rule already has been applied. If not, then the parent rule is obtained at Block 3442. If yes, then at Block 3422, the values are retrieved from the database and evaluated at Block 3422.

At Block 3424, a test is made as to whether the number of samples that has passed the start criteria is greater than 0. If not, then the next rule is obtained at Block 3442. If yes, a test is made at Block 3426 as to whether the past percentage is greater than the past percentage required by the rule. If yes, then a test is made at Block 3428 15 as to whether the number of samples that has passed stop criteria is greater than 0. If yes, then at Block 3432, a test is made as to whether a past percentage is required, and if yes, the next rule is obtained at Block 3442.

If the results of the tests at Blocks 3416, 3428 or 3432 is no, then at Block 3434, the new results are inserted and at Block 3436, it is recorded that the rule has been applied. The next rule is obtained at Block 3410, and operations continue until there are no rules remaining at Block 3404. Table 3 illustrates operations that may be used to insert the new results (Block 3434).

TABLE 3

| Field | Function | Structure |
|---|---|---|
| Dcc_id | Related to pg1_dcc | NUMBER(10) NOT NULL |
| Due_days | Number of due days before the task on the new component is due Can be −1 to create the component on the next due task or it can be <−900 to make the task due a certain number of days from the sow date | NUMBER(3) NOT NULL |
| Component Operation | Component to create The operation to create the component on | VARCHAR2(40) VARCHAR2(40) |
| Method | The method to create the component on | VARCHAR2(40) |
| Sample_type | The sample type to limit the creation of new components to | VARCHAR2(100) |

Table 4 is a listing of modules that can be used to embody the operations of FIG. 34.

TABLE 4

| Procedure/Function Name | Function | Parameters | Returns |
|---|---|---|---|
| Create_result | Creates an empty result | Task ID Component Name Result Plan ID New Sequence New Due Date | Success 0 Failure −1 Problem 100003– 100013 |
| Create_schedule | Does the full evaluation of a submission | Task ID Optional Mode | None |
| Schedule_sample_by_sample | Same as create_schedule for one sample only | Task ID | None |
| Process_components | Processes all of the components to activate for a rule on the sample or within the submission | DCC ID Submission ID Sample ID Sequence Action | Success 0 Failure −1 |
| Evaluate_condition | Evaluates the rule and determines | DCC ID | Failure −1 |

TABLE 4-continued

| Procedure/Function Name | Function | Parameters | Returns |
|---|---|---|---|
| | whether or not it has passed | Submission ID<br>Sample ID<br>Task ID<br>Sequence | Passed 0<br>Stop Condition is true 2<br>Did not pass 1 |
| Make_result_status_request | Makes a status request to the status monitor | Result ID<br>Result Version | Success 0<br>Failure −1 |
| Create_parameter | Creates a parameter on the sample or on the submission | ID<br>Class<br>Prompt<br>Response<br>Hide | Success 0<br>Failure −1 |
| Reject_sample | Rejects all future tasks for a sample | Sample ID<br>Sequence | None |
| Write_to_debug | Writes a message to the debug table | Status<br>Message | None |

Table 5 provides a detailed example of an implementation of Rule 1000000634 of Table 1. This rule tests to see if the previous three data collections exhibited less than a 20% increase in stem length.

TABLE 5

| Field | Setting |
|---|---|
| DCC_ID | 1000000634 |
| PARENT_DCC_ID | 1000000602 |
| SEQUENCE | 14 |
| DCC_VERSION | 4 |
| STATUS | CURRENT |
| STUDY_ID | 100010269 |
| RESULT_PLAN_ID | 105008522 |
| CONDITION | GROWTH STAGE 650 CTL |
| ACTION | A |
| EXIT_WHEN_TRUE | N |
| HIDE_PARAMETER | N |
| RUN_ONCE | Y |
| MAX_TASK_SEQUENCE | 58 |
| SCOPE_LEVEL | SUBMISSION |
| METHOD | ARABIDOP 97 SOIL CORE/ARABIDOP 97 SOIL GROWTH STAGES/ |
| START_SQL | select count(s sample_id)<br>from nais_results r3,<br>  nais_tasks t3,<br>  nais_samples s<br>where r3 submission_id = submission_id<br>and r3 component = 'Stem length (base to top unopened buds)'<br>and r3 task_id = t3 task_id<br>and t3 sequence = sequence<br>and r3 sample_id = s sample_id<br>and s sample_type = 'ORANGE_CONTROL'<br>and not Exists(select * from nais_parameters where prompt = 'NO SEED OR DEATH' and id = s sample_id)<br>and r3 result_version = (SELECT Max(result_version) FROM nais_results WHERE result_id = r3 result_id)<br>and exists(select 'x'<br>  from nai_results r2, nai_tasks t2<br>  where r2 component = 'Stem length (base to top unopened buds)'<br>  and r2.task_id = t2 task_id<br>  and t2.sequence = sequence - 2<br>  and t3 sample_id = t2 sample_id<br>  and r2 result_version = (SELECT Max(result_version) FROM nais_results WHERE result_id = r2 result_id)<br>  and nv1(r3.number_value, 0) < 1 2 * nv1(r2 number_value, 0)<br>  and exists(select 'x'<br>    from nai_results r1, nai_tasks t1<br>    where r1.component = 'Stem length (base to top unopened buds)'<br>    and r1.task_id = t1 task_id<br>    and t1.sequence = .sequence - 4<br>    and t1.sample_id = t2 sample_id<br>    and r1 result_version = (SELECT Max(result_version) FROM nais_results WHERE result_id = r1 result_id)<br>    and nv1(r2 number_value, 0) < 1 2 * nv1(r1 number_value, 0))) |
| START_SCOPE_SQL | select count(s.sample_id)<br>from nais_results r3,<br>  nais_tasks t3,<br>  nais_samples s<br>where r3 submission_id = submission_id<br>and r3 component = 'Stem length (base to top unopened buds)'<br>and r3 task_id = t3 task_id<br>and t3 sequence = sequence<br>and r3 sample_id = s sample_id<br>and s sample_type = 'ORANGE_CONTROL'<br>and not Exists(select * from nais_parameters where prompt = 'NO SEED OR DEATH' and id = s sample_id)<br>and r3 result_version = (SELECT Max(result_version) FROM nais_results WHERE result_id = r3.result_id)<br>and exists(select 'x'<br>  from nai_results r2.nai_tasks t2<br>  where r2 component = 'Stem length (base to top unopened buds)'<br>  and r2 task_id = t2 task_id<br>  and t2 sequence = sequence - 2<br>  and t3 sample_id = t2 sample_id<br>  and r2 result_version = (SELECT Max(result_version) FROM nais_results WHERE result_id = r2 result_id)<br>  and nv1(r3 number_value. 0) < 1 2 * nv1(r2 number_value, 0)<br>  and exists(select 'x'<br>    from nai_results r1, nai_tasks t1<br>    where r1 component = 'Stem length (base to top unopened buds)' |

TABLE 5-continued

| Field | Setting |
|---|---|
| | and r1 task_id = t1 task_id |
| | and t1 sequence = sequence - 4 |
| | and t1 sample_id = t2 sample_id |
| | and r1 result_veision = (SELECT Max(result_version) FROM nais_results WHERE result_id = r1 result_id) |
| | and nvl(r2 number_value, 0) < 1 2 * nvl(r1 number_value, 0))) |
| STOP_SQL | Null |
| STOP_SCOPE_SQL | Null |
| PERCENTAGE_REQUIRED | 100 |

Table 6 provides a detailed example of an implementation of Rule 1000000605 of Table 1. This rile tests to see if 50% of the population has answered "Yes" to the characteristic "Can flower buds be seen?".

TABLE 6

| Field | Setting |
|---|---|
| DCC_ID | 1000000605 |
| PARENT_DCC_ID | 1000000602 |
| SEQUENCE | 8 |
| DCC_VERSION | 4 |
| STATUS | CURRENT |
| STUDY_ID | 100010269 |
| RESULT_PLAN_ID | 105008522 |
| CONDITION | GROWTH STAGE 510 DAY |
| ACTION | A |
| EXIT_WHEN_TRUE | N |
| HIDE_PARAMETER | N |
| RUN_ONCE | Y |
| MAX_TASK_SEQUENCE | 44 |
| SCOPE_LEVEL | SUBMISSION |
| METHOD | ARABIDOP 97 SOIL CORE/ARABIDOP 97 SOIL GROWTH STAGES/ |
| START_SQL | SELECT Count(DISTINCT s.sample_id) FROM nais_sample s, nais_results r WHERE r sample_id = s.sample_id AND s sample_type = 'ORANGE' AND r submission_id = submission_id AND r.text_value = 'Y' AND r.component = 'Can flower buds be seen?' AND r result_version = (SELECT Max(result_version) FROM nais_results WHERE result_id = r.result_id) AND Not Exists(select * from nais_parameters where prompt = 'NO SEED OR DEATH' and id = s.sample_id) |
| START_SCOPE_SQL | SELECT Count(DISTINCT s.sample_id) FROM nais_samples s, nais_results r WHERE r sample_id = s sample_id AND s sample_type = 'ORANGE' AND r.submission_id = submission_id AND r component = 'Can flower buds be seen?' AND r.result_version = (SELECT Max(result_veision) FROM nais_results WHERE result_id = r.result_id) AND Not Exists(select * from nais_parameters where prompt = 'NO SEED OR DEATH' and id = s.sample_id) |
| STOP_SQL | Null |
| STOP_SCOPE_SQL | Null |
| PERCENTAGE_REQUIRED | 50 |

Accordingly, dynamic scheduling can reduce and preferably minimize the collection of irrelevant characteristics and can also anticipate the need to collect new characteristics. The user need not make a determination as to irrelevance and/or the need for new characteristics, but rather can merely take the measurements that are instructed by the dynamic scheduling.

As was described above, dynamic scheduling may be particularly useful when used in conjunction with matrix data collection according to embodiments of the present invention, because the matrix can filter out characteristics. The matrix can be used to filter out characteristics so the user need not see characteristics that the user does not need to data collect. Moreover, on a given day, the user may enter values for particular characteristics that may trigger new data collection on the same day, so that new characteristics may be activated on the same day rather than waiting until the next day. By activating characteristics when a task has been completed, a task can be reactivated. When the user sees that the task is reactivated, for example by seeing that the asterisk has disappeared for the characteristic, then the user can know that more data should be collected.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of collecting data about a plurality of samples that possess characteristics that change over time, the samples being contained in an array of containers that are arranged in a container spatial relationship, the method comprising:
   displaying for user input a matrix of cells in a cell spatial relationship that corresponds to the container spatial relationship; and
   accepting user input into at least one of the cells of the matrix that is displayed, of at least one value of at least one of the characteristics that change over time for at least one of the samples that corresponds to the at least one of the cells in the matrix that is displayed wherein the displaying is preceded by:
   storing in a database, a plurality of past values of the characteristics of the plurality of samples that were collected during at least one past time interval;
   storing in a rule base, a plurality of rules that determine whether a characteristic of a sample is to be collected and, if so, that identify the characteristic which is to be collected, based on values of characteristics of samples;
   applying the plurality of rules that are stored in the rule base to the plurality of past values that are stored in the database to identify target samples from which data is to be collected from the plurality of samples and to identify at least one target characteristic to be collected for the target samples that are identified; and
   wherein the displaying comprises displaying the matrix of cells for the at least one target characteristic to be collected in the target samples from which data is to be collected.

2. A method according to claim 1 wherein the accepting is followed by: storing in a database, the at least one value of the at least one of the characteristics that change over time for the at least one of the samples.

3. A method according to claim 1 wherein the array of containers includes a plurality of rows and columns of containers in a container spatial relationship and wherein the matrix of cells includes a corresponding plurality of rows and columns of cells in a cell spatial relationship that corresponds to the container spatial relationship.

4. A method according to claim 1 wherein the plurality of samples are contained in a plurality of arrays of containers and wherein the displaying is preceded by: accepting user selection of an array of containers from the plurality of arrays of containers.

5. A method according to claim 1 wherein the displaying is preceded by:
  accepting user selection of a characteristic from the characteristics that change over time; and wherein the displaying comprises displaying a matrix of cells in a cell spatial relationship that corresponds to the container spatial relationship and that includes data entry parameters for the characteristic that was selected.

6. A method according to claim 5 wherein the data entry parameters comprise at least one of a yes/no selection, a data entry box and a pull down menu of selection options.

7. A method according to claim 5 wherein the accepting user selection of a characteristic is followed by displaying user instructions for obtaining a value of the characteristic that was selected.

8. A method according to claim 1: wherein the accepting user input comprises accepting user input of a default value of the at least one of the characteristics for the cells of the matrix that is displayed, and accepting user input into at least one of the cells of the matrix that is displayed, of at least one value that is different from the default value.

9. A method according to claim 2: wherein the accepting user input comprises accepting user input of a default value of the at least one of the characteristics for the cells of the matrix that is displayed, and accepting user input into at least one of the cells of the matrix that is displayed of at least one value that is different from the default value; and wherein the storing comprises storing in the database, the default value for the cells of the matrix except for the at least one of the cells in which the at least one value that is different from the default value was accepted, and storing in the database, the at least one value for the at least one of the cells.

10. A method according to claim 2 wherein the following is performed between the accepting and the storing: accepting user input into at least one of the cells of the matrix that is displayed, of at least one corrected value of at least one of the characteristics that change over time for at least one of the samples that corresponds to the at least one of the cells in the matrix that is displayed.

11. A method according to claim 1 wherein the displaying and accepting are repeatedly performed to collect data for a plurality of matrices of cells that correspond to a plurality of arrays of containers.

12. A method according to claim 1 wherein the displaying and accepting are repeatedly performed to collect data for a plurality of the characteristics that change over time.

13. A method according to claim 1 wherein the displaying and accepting are repeatedly performed to collect data over a plurality of sequential time intervals.

14. A method according to claim 1 wherein the displaying is followed by: accepting user input of at least one value of the at least one target characteristic to be collected in the target samples from which data is to be collected; and storing in the database, the at least one target value of the at least one target characteristic to be collected in the target samples from which data is to be collected.

15. A method according to claim 14 wherein the applying, displaying, accepting and storing the at least one value are repeatedly performed in sequence during a plurality of time intervals.

16. A method according to claim 1 wherein the plurality of rules include a rule that begins or terminates collection of a characteristic in a sample based on a percentage of the samples having a value of the characteristic during a past time interval.

17. A method according to claim 1 wherein the plurality of rules include a rule that begins or terminates collection of a first characteristic in a sample based on a percentage of the samples having a value of a second characteristic during a past time interval.

18. A method according to claim 1 wherein the plurality of rules include a rule that begins or terminates collection of a characteristic in a sample based on a percentage of the samples failing to have the characteristic during a past time interval.

19. A method according to claim 1 wherein the plurality of rules include a rule that begins or terminates collection of a first characteristic in a sample based on a percentage of the samples failing to have a second characteristic during a past time interval.

20. A method of scheduling data collection of characteristics of a plurality of samples, wherein values of the characteristics change over time, the method comprising:
  storing in a database, a plurality of past values of the characteristics of the plurality of samples that were collected during at least one past time interval;
  storing in a rule base, a plurality of rules that determine whether a characteristic of a sample is to be collected and, if so, that identify the characteristic which is to be collected, based on values of characteristics of samples;
  applying the plurality of rules that are stored in the rule base to the plurality of past values that are stored in the database to identify target samples from which data is to be collected from the plurality of samples and to identify at least one target characteristic to be collected for the target samples that are identified; and
  outputting user instructions to collect data for the at least one target characteristic to be collected in the target samples from which data is to be collected.

21. A method according to claim 20 wherein the outputting is followed by: accepting user input of at least one value of the at least one target characteristic to be collected in the target samples from which data is to be collected; and storing in the database, the at least one target value of the at least one target characteristic to be collected in the target samples from which data is to be collected.

22. A method according to claim 21 wherein the applying, outputting, accepting and storing the at least one value are repeatedly performed in sequence during a plurality of time intervals.

23. A method according to claim 20 wherein the plurality of rules include a rule that begins or terminates collection of a characteristic in a sample based on a percentage of the samples having a value of the characteristic during a past time interval.

24. A method according to claim 20 wherein the plurality of rules include a rule that begins or terminates collection of a first characteristic in a sample based on a percentage of the samples having a value of a second characteristic during a past time interval.

25. A method according to claim 20 wherein the plurality of rules include a rule that begins or terminates collection of a characteristic in a sample based on a percentage of the samples failing to have the characteristic during a past time interval.

26. A method according to claim 20 wherein the plurality of rules include a rule that begins or terminates collection of a first characteristic in a sample based on a percentage of the samples failing to have a second characteristic during a past time interval.

27. A method according to claim 20 wherein the plurality of samples are contained in a plurality of arrays of samples, and wherein the plurality of rules include a rule that begins or terminates collection of a characteristic in a sample based on a percentage of the samples in the array that includes the sample having a value of the characteristic during a past time interval.

28. A method according to claim 20 wherein the plurality of samples are contained in a plurality of arrays of samples, and wherein the plurality of rules include a rule that begins or terminates collection of a first characteristic in a sample based on a percentage of the samples in the array that includes the sample having a value of a second characteristic during a past time interval.

29. A method according to claim 20 wherein the plurality of samples are contained in a plurality of arrays of samples, and wherein the plurality of rules include a rule that begins or terminates collection of a characteristic in a sample based on a percentage of the samples in the array that includes the sample failing to have the characteristic during a past time interval.

30. A method according to claim 20 wherein the plurality of samples are contained in a plurality of arrays of samples, and wherein the plurality of rules include a rule that begins or terminates collection of a first characteristic in a sample based on a percentage of the samples in the array that includes the sample failing to have a second characteristic during a past time interval.

31. A method according to claim 20 wherein the plurality of samples are contained in an array of containers that are arranged in a container spatial relationship, and wherein the outputting comprises: displaying a matrix of cells in a cell spatial relationship that corresponds to the container spatial relationship; and accepting user input into at least one of the cells of the matrix that is displayed, of at least one value of at least one of the target characteristic to be collected for at least one of the target samples from which data is to be collected that corresponds to the at least one of the cells in the matrix that is displayed.

32. A method according to claim 31 wherein the plurality of samples are contained in a plurality of arrays of containers and wherein the displaying is preceded by: accepting user selection of an array of containers from the plurality of arrays of containers.

33. A method according to claim 31 wherein the displaying is preceded by:
accepting user selection of a target characteristic from the characteristics that change over time; and wherein the displaying comprises displaying a matrix of cells in a cell spatial relationship that corresponds to the container spatial relationship and that includes data entry parameters for the target characteristic that was selected.

34. A method according to claim 31: wherein the accepting user input comprises accepting user input of a default value of the at least one of the target characteristics for the cells of the matrix that is displayed, and accepting user input into at least one of the cells of the matrix that is displayed, of at least one value that is different from the default value.

35. A method according to claim 31 wherein the following is performed between the accepting and the storing: accepting user input into at least one of the cells of the matrix that is displayed, of at least one corrected value of at least one of the target characteristics for at least one of the target samples from which data is to be collected that corresponds to the at least one of the cells in the matrix that is displayed.

36. A system for collecting data about a plurality of samples that possess characteristics that change over time, the samples being contained in an array of containers that are arranged in a container spatial relationship, the system comprising:
means for displaying for user input a matrix of cells in a cell spatial relationship that corresponds to the container spatial relationship;
means for accepting user input into at least one of the cells of the matrix that is displayed, of at least one value of at least one of the characteristics that change over time for at least one of the samples that corresponds to the at least one of the cells in the matrix that is displayed;
means for storing in a database, a plurality of past values of the characteristics of the plurality of samples that were collected during at least one past time interval;
means for storing in a rule base, a plurality of rules that determine whether a characteristic of a sample is to be collected and, if so, that identify the characteristic which is to be collected, based on values of characteristics of samples;
means for applying the plurality of rules that are stored in the rule base to the plurality of past values that are stored in the database to identify target samples from which data is to be collected from the plurality of samples and to identify at least one target characteristic to be collected for the target samples that are identified; and
means for outputting user instructions to collect data for the at least one target characteristic to be collected in the target samples from which data is to be collected;
wherein the means for displaying comprises means for displaying the matrix of cells for the at least one target characteristic to be collected in the target samples from which data is to be collected.

37. A system according to claim 36 further comprising: means for storing in a database, the at least one value of the at least one of the characteristics that change over time for the at least one of the samples.

38. A system according to claim 36 wherein the array of containers includes a plurality of rows and columns of containers in a container spatial relationship and wherein the matrix of cells includes a corresponding plurality of rows and columns of cells in a cell spatial relationship that corresponds to the container spatial relationship.

39. A system according to claim 36 wherein the plurality of samples are contained in a plurality of arrays of containers and wherein the system further comprises: means for accepting user selection of an array of containers from the plurality of arrays of containers.

40. A system according to claim 36 further comprising: means for accepting user selection of a characteristic from the characteristics that change over time; and wherein the means for displaying comprises means for displaying a matrix of cells in a cell spatial relationship that corresponds to the container spatial relationship and that includes data entry parameters for the characteristic that was selected.

41. A system according to claim 40 wherein the data entry parameters comprise at least one of a yes/no selection, a data entry box and a pull down menu of selection options.

42. A system according to claim 40 further comprising means for displaying user instructions for obtaining a value of the characteristic that was selected.

43. A system according to claim 36: wherein the means for accepting user input comprises means for accepting user input of a default value of the at least one of the characteristics for the cells of the matrix that is displayed, and means for accepting user input into at least one of the cells of the matrix that is displayed, of at least one value that is different from the default value.

44. A system according to claim 37: wherein the means for accepting user input comprises means for accepting user input of a default value of the at least one of the characteristics for the cells of the matrix that is displayed, and means for accepting user input into at least one of the cells of the matrix that is displayed of at least one value that is different from the default value; and wherein the means for storing comprises means for storing in the database, the default value for the cells of the matrix except for the at least one of the cells in which the at least one value that is different from the default value was accepted, and means for storing in the database, the at least one value for the at least one of the cells.

45. A system according to claim 37 further comprising: means for accepting user input into at least one of the cells of the matrix that is displayed, of at least one corrected value of at least one of the characteristics that change over time for at least one of the samples that corresponds to the at least one of the cells in the matrix that is displayed.

46. A system according to claim 36 wherein the means for displaying and the means for accepting are repeatedly activated to collect data for a plurality of matrices of cells that correspond to a plurality of arrays of containers.

47. A system according to claim 36 wherein the means for displaying and the means for accepting are repeatedly activated to collect data for a plurality of the characteristics that change over time.

48. A system according to claim 36 wherein the means for displaying and the means for accepting are repeatedly activated to collect data over a plurality of sequential time intervals.

49. A system according to claim 36 further comprising: means for accepting user input of at least one value of the at least one target characteristic to be collected in the target samples from which data is to be collected; and means for storing in the database, the at least one target value of the at least one target characteristic to be collected in the target samples from which data is to be collected.

50. A system according to claim 49 wherein the means for applying, the means for displaying, the means for accepting and the means for storing the at least one value are repeatedly activated in sequence during a plurality of time intervals.

51. A system according to claim 36 wherein the plurality of rules include a rule that begins or terminates collection of a characteristic in a sample based on a percentage of the samples having a value of the characteristic during a past time interval.

52. A system according to claim 36 wherein the plurality of rules include a rule that begins or terminates collection of a first characteristic in a sample based on a percentage of the samples having a value of a second characteristic during a past time interval.

53. A system according to claim 36 wherein the plurality of rules include a rule that begins or terminates collection of a characteristic in a sample based on a percentage of the samples failing to have the characteristic during a past time interval.

54. A system according to claim 36 wherein the plurality of rules include a rule that begins or terminates collection of a first characteristic in a sample based on a percentage of the samples failing to have a second characteristic during a past time interval.

55. A system for scheduling the collection of characteristics of a plurality of samples, wherein values of the characteristics change over time, the system comprising:
means for storing in a database, a plurality of past values of the characteristics of the plurality of samples that were collected during at least one past time interval;
means for storing in a rule base, a plurality of rules that determine whether a characteristic of a sample is to be collected and, if so, that identify the characteristic which is to be collected, based on values of characteristics of samples;
means for applying the plurality of rules that are stored in the rule base to the plurality of past values that are stored in the database to identify target samples from which data is to be collected from the plurality of samples and to identify at least one target characteristic to be collected for the target samples that are identified; and
means for outputting user instructions to collect data for the at least one target characteristic to be collected in the target samples from which data is to be collected.

56. A system according to claim 55 further comprising: means for accepting user input of at least one value of the at least one target characteristic to be collected in the target samples from which data is to be collected; and means for storing in the database, the at least one target value of the at least one target characteristic to be collected in the target samples from which data is to be collected.

57. A system according to claim 56 wherein the means for applying, the means for outputting, the means for accepting and the means for storing the at least one value are repeatedly activated in sequence during a plurality of time intervals.

58. A system according to claim 55 wherein the plurality of rules include a rule that begins or terminates collection of a characteristic in a sample based on a percentage of the samples having a value of the characteristic during a past time interval.

59. A system according to claim 55 wherein the plurality of rules include a rule that begins or terminates collection of a first characteristic in a sample based on a percentage of the samples having a value of a second characteristic during a past time interval.

60. A system according to claim 55 wherein the plurality of rules include a rule that begins or terminates collection of a characteristic in a sample based on a percentage of the samples failing to have the characteristic during a past time interval.

61. A system according to claim 55 wherein the plurality of rules include a rule that begins or terminates collection of a first characteristic in a sample based on a percentage of the samples failing to have a second characteristic during a past time interval.

62. A system according to claim 55 wherein the plurality of samples are contained in a plurality of arrays of samples, and wherein the plurality of rules include a rule that begins or terminates collection of a characteristic in a sample based on a percentage of the samples in the array that includes the sample having a value of the characteristic during a past time interval.

63. A system according to claim 55 wherein the plurality of samples are contained in a plurality of arrays of samples, and wherein the plurality of rules include a rule that begins or terminates collection of a first characteristic in a sample based on a percentage of the samples in the array that includes the sample having a value of a second characteristic during a past time interval.

64. A system according to claim 55 wherein the plurality of samples are contained in a plurality of arrays of samples, and wherein the plurality of rules include a rule that begins or terminates collection of a characteristic in a sample based on a percentage of the samples in the array that includes the sample failing to have the characteristic during a past time interval.

65. A system according to claim 55 wherein the plurality of samples are contained in a plurality of arrays of samples, and wherein the plurality of rules include a rule that begins or terminates collection of a first characteristic in a sample based on a percentage of the samples in the array that includes the sample failing to have a second characteristic during a past time interval.

66. A system according to claim 55 wherein the plurality of samples are contained in an array of containers that are arranged in a container spatial relationship, and wherein the means for outputting comprises: means for displaying a matrix of cells in a cell spatial relationship that corresponds to the container spatial relationship; and means for accepting user input into at least one of the cells of the matrix that is displayed, of at least one value of at least one of the target characteristic to be collected for at least one of the target samples from which data is to be collected that corresponds to the at least one of the cells in the matrix that is displayed.

67. A system according to claim 66 wherein the plurality of samples are contained in a plurality of arrays of containers and wherein the system further comprises: means for accepting user selection of an array of containers from the plurality of arrays of containers.

68. A system according to claim 66 further comprising: means for accepting user selection of a target characteristic from the characteristics that change over time; and wherein the means for displaying comprises means for displaying a matrix of cells in a cell spatial relationship that corresponds to the container spatial relationship and that includes data entry parameters for the target characteristic that was selected.

69. A system according to claim 66: wherein the means for accepting user input comprises means for accepting user input of a default value of the at least one of the target characteristics for the cells of the matrix that is displayed, and means for accepting user input into at least one of the cells of the matrix that is displayed, of at least one value that is different from the default value.

70. A system according to claim 66 further comprising: means for accepting user input into at least one of the cells of the matrix that is displayed, of at least one corrected value of at least one of the target characteristics for at least one of the target samples from which data is to be collected that corresponds to the at least one of the cells in the matrix that is displayed.

71. A computer program product that collects data about a plurality of samples that possess characteristics that change over time, the samples being contained in an array of containers that are arranged in a container spatial relationship, the computer program product comprising a computer usable storage medium having computer-readable program code embodied in the medium, the computer-readable program code comprising:
 computer-readable program code that is configured to display for user input a matrix of cells in a cell spatial relationship that corresponds to the container spatial relationship;
 computer-readable program code that is configured to accept user input into at least one of the cells of the matrix that is displayed, of at least one value of at least one of the characteristics that change over time for at least one of the samples that corresponds to the at least one of the cells in the matrix that is displayed;
 computer-readable program code that is configured to store in a database, a plurality of past values of the characteristics of the plurality of samples from which data was collected during at least one past time interval;
 computer-readable program code that is configured to store in a rule base, a plurality of rules that determine whether a characteristic of a sample is to be data collected and, if so, that identify the characteristic which is to be collected, based on values of characteristics of samples;
 computer-readable program code that is configured to apply the plurality of rules that are stored in the rule base to the plurality of past values that are stored in the database to identify target samples from which data is to be collected from the plurality of samples and to identify at least one target characteristic to be collected for the target samples that are identified; and
 computer-readable program code that is configured to output user instructions to collect data for the at least one target characteristic to be collected in the target samples from which data is to be collected;
 wherein the computer-readable program code that is configured to display comprises computer-readable program code that is configured to display the matrix of cells for the at least one target characteristic to be collected in the target samples from which data is to be collected.

72. A computer program product according to claim 71 further comprising:
 computer-readable program code that is configured to store in a database, the at least one value of the at least one of the characteristics that change over time for the at least one of the samples.

73. A computer program product according to claim 71 wherein the array of containers includes a plurality of rows and columns of containers in a container spatial relationship and wherein the matrix of cells includes a corresponding plurality of rows and columns of cells in a cell spatial relationship that corresponds to the container spatial relationship.

74. A computer program product according to claim 71 wherein the plurality of samples are contained in a plurality of arrays of containers and wherein the computer program product further comprises: computer-readable program code that is configured to accept user selection of an array of containers from the plurality of arrays of containers.

75. A computer program product according to claim 71 further comprising:
 computer-readable program code that is configured to accept user selection of a characteristic from the characteristics that change over time; and wherein the computer-readable program code that is configured to display comprises computer-readable program code that is configured to display a matrix of cells in a cell spatial relationship that corresponds to the container spatial relationship and that includes data entry parameters for the characteristic that was selected.

76. A computer program product according to claim 75 wherein the data entry parameters comprise at least one of a yes/no selection, a data entry box and a pull down menu of selection options.

77. A computer program product according to claim 75 further comprising:
computer-readable program code that is configured to display user instructions for obtaining a value of the characteristic that was selected.

78. A computer program according to claim 71: wherein the computer-readable program code that is configured to accept user input comprises computer-readable program code that is configured to accept user input of a default value of the at least one of the characteristics for the cells of the matrix that is displayed, and computer-readable program code that is configured to accept user input into at least one of the cells of the matrix that is displayed, of at least one value that is different from the default value.

79. A computer program product according to claim 72: wherein the computer-readable program code that is configured to accept user input comprises computer-readable program code that is configured to accept user input of a default value of the at least one of the characteristics for the cells of the matrix that is displayed, and computer-readable program code that is configured to accept user input into at least one of the cells of the matrix that is displayed of at least one value that is different from the default value; and wherein the computer-readable program code that is configured to store comprises computer-readable program code that is configured to store in the database, the default value for the cells of the matrix except for the at least one of the cells in which the at least one value that is different from the default value was accepted, and computer-readable program code that is configured to store in the database, the at least one value for the at least one of the cells.

80. A computer program product according to claim 72 further comprising:
computer-readable program code that is configured to accept user input into at least one of the cells of the matrix that is displayed, of at least one corrected value of at least one of the characteristics that change over time for at least one of the samples that corresponds to the at least one of the cells in the matrix that is displayed.

81. A computer program product according to claim 71 wherein the computer-readable program code that is configured to display and computer-readable program code that is configured to accept are repeatedly activated to collect data for a plurality of matrices of cells that correspond to a plurality of arrays of containers.

82. A computer program product according to claim 71 wherein the computer-readable program code that is configured to display and the computer-readable program code that is configured to accept are repeatedly activated to collect data for a plurality of the characteristics that change over time.

83. A computer program product according to claim 71 wherein the computer-readable program code that is configured to display and the computer-readable program code that is configured to accept are repeatedly activated to collect data over a plurality of sequential time intervals.

84. A computer program product according to claim 71 further comprising: computer-readable program code that is configured to accept user input of at least one value of the at least one target characteristic to be collected in the target samples from which data is to be collected; and computer-readable program code that is configured to store in the database, the at least one target value of the at least one target characteristic to be collected in the target samples from which data is to be collected.

85. A computer program product according to claim 84 wherein the computer-readable program code that is configured to apply, the computer-readable program code that is configured to display, the computer-readable program code that is configured to accept and the computer-readable program code that is configured to store the at least one value are repeatedly activated in sequence during a plurality of time intervals.

86. A computer program product according to claim 71 wherein the plurality of rules include a rule that begins or terminates collection of a characteristic in a sample based on a percentage of the samples having a value of the characteristic during a past time interval.

87. A computer program product according to claim 71 wherein the plurality of rules include a rule that begins or terminates collection of a first characteristic in a sample based on a percentage of the samples having a value of a second characteristic during a past time interval.

88. A computer program product according to claim 71 wherein the plurality of rules include a rule that begins or terminates collection of a characteristic in a sample based on a percentage of the samples failing to have the characteristic during a past time interval.

89. A computer program product according to claim 71 wherein the plurality of rules include a rule that begins or terminates collection of a first characteristic in a sample based on a percentage of the samples failing to have a second characteristic during a past time interval.

90. A computer program product that schedules the collection of characteristics of a plurality of samples, wherein values of the characteristics change over time, the computer program product comprising a computer usable storage medium having computer-readable program code embodied in the medium, the computer-readable program code comprising:
computer-readable program code that is configured to store in a database, a plurality of past values of the characteristics of the plurality of samples that were collected during at least one past time interval;
computer-readable program code that is configured to store in a rule base, a plurality of rules that determine whether a characteristic of a sample is to be collected and, if so, that identify the characteristic which is to be collected, based on values of characteristics of samples;
computer-readable program code that is configured to apply the plurality of rules that are stored in the rule base to the plurality of past values that are stored in the database to identify target samples from which data is to be collected from the plurality of samples and to identify at least one target characteristic to be collected for the target samples that are identified; and
computer-readable program code that is configured to output user instructions to collect data for the at least one target characteristic to be collected in the target samples from which data is to be collected.

91. A computer program product according to claim 90 further comprising: computer-readable program code that is configured to accept user input of at least one value of the at least one target characteristic to be collected in the target samples from which data is to be collected; and computer-readable program code that is configured to store in the database, the at least one target value of the at least one target characteristic to be collected in the target samples from which data is to be collected.

92. A computer program product according to claim 91 wherein the computer-readable program code that is configured to apply, the computer-readable program code that is configured to output, the computer-readable program code that is configured to accept and the computer-readable program code that is configured to store the at least one value are repeatedly activated in sequence during a plurality of time intervals.

93. A computer program product according to claim 90 wherein the plurality of rules include a rule that begins or terminates collection of a characteristic in a sample based on a percentage of the samples having a value of the characteristic during a past time interval.

94. A computer program product according to claim 90 wherein the plurality of rules include a rule that begins or terminates collection of a first characteristic in a sample based on a percentage of the samples having a value of a second characteristic during a past time interval.

95. A computer program product according to claim 90 wherein the plurality of rules include a rule that begins or terminates collection of a characteristic in a sample based on a percentage of the samples failing to have the characteristic during a past time interval.

96. A computer program product according to claim 90 wherein the plurality of rules include a rule that begins or terminates collection of a first characteristic in a sample based on a percentage of the samples failing to have a second characteristic during a past time interval.

97. A computer program product according to claim 90 wherein the plurality of samples are contained in a plurality of arrays of samples, and wherein the plurality of rules include a rule that begins or terminates collection of a characteristic in a sample based on a percentage of the samples in the array that includes the sample having a value of the characteristic during a past time interval.

98. A computer program product according to claim 90 wherein the plurality of samples are contained in a plurality of arrays of samples, and wherein the plurality of rules include a rule that begins or terminates collection of a first characteristic in a sample based on a percentage of the samples in the array that includes the sample having a value of a second characteristic during a past time interval.

99. A computer program product according to claim 90 wherein the plurality of samples are contained in a plurality of arrays of samples, and wherein the plurality of rules include a rule that begins or terminates collection of a characteristic in a sample based on a percentage of the samples in the array that includes the sample failing to have the characteristic during a past time interval.

100. A computer program product according to claim 90 wherein the plurality of samples are contained in a plurality of arrays of samples, and wherein the plurality of rules include a rule that begins or terminates collection of a first characteristic in a sample based on a percentage of the samples in the array that includes the sample failing to have a second characteristic during a past time interval.

101. A computer program product according to claim 90 wherein the plurality of samples are contained in an array of containers that are arranged in a container spatial relationship, and wherein the computer-readable program code that is configured to output comprises: computer-readable program code that is configured to display a matrix of cells in a cell spatial relationship that corresponds to the container spatial relationship; and computer-readable program code that is configured to accept user input into at least one of the cells of the matrix that is displayed, of at least one value of at least one of the target characteristic to be collected for at least one of the target samples from which data is to be collected that corresponds to the at least one of the cells in the matrix that is displayed.

102. A computer program product according to claim 101 wherein the plurality of samples are contained in a plurality of arrays of containers and wherein the computer program product further comprises: computer-readable program code that is configured to accept user selection of an array of containers from the plurality of arrays of containers.

103. A computer program product according to claim 101 further comprising:
computer-readable program code that is configured to accept user selection of a target characteristic from the characteristics that change over time; and wherein the computer-readable program code that is configured to display comprises computer-readable program code that is configured to display a matrix of cells in a cell spatial relationship that corresponds to the container spatial relationship and that includes data entry parameters for the target characteristic that was selected.

104. A computer program product according to claim 101: wherein the computer-readable program code that is configured to accept user input comprises computer-readable program code that is configured to accept user input of a default value of the at least one of the target characteristics for the cells of the matrix that is displayed, and computer-readable program code that is configured to accept user input into at least one of the cells of the matrix that is displayed, of at least one value that is different from the default value.

105. A computer program product according to claim 101 further comprising: computer-readable program code that is configured to accept user input into at least one of the cells of the matrix that is displayed, of at least one corrected value of at least one of the target characteristics for at least one of the target samples from which data is to be collected that corresponds to the at least one of the cells in the matrix that is displayed.

\* \* \* \* \*